United States Patent
Lundahl et al.

(10) Patent No.: US 10,766,711 B2
(45) Date of Patent: Sep. 8, 2020

(54) MODULAR PACKAGE SORTING SYSTEM

(71) Applicant: ADVANCED TECHNOLOGY & RESEARCH CORP., Beltsville, MD (US)

(72) Inventors: Robert Lundahl, Frederick, MD (US); Robert Cutlip, Silver Spring, MD (US); Mark Bankard, Sykesville, MD (US); Dwight Koogle, Middletown, MD (US); Crystal Yannuzzi, Glen Burnie, MD (US); Matthew Fontaine, Pasadena, MD (US)

(73) Assignee: Advanced Technology & Research Corp., Beltsville, MD (US)

( * ) Notice: Subject to any disclaimer, the term of this patent is extended or adjusted under 35 U.S.C. 154(b) by 0 days.

(21) Appl. No.: 16/537,503

(22) Filed: Aug. 9, 2019

(65) Prior Publication Data
US 2020/0254490 A1   Aug. 13, 2020

Related U.S. Application Data

(60) Provisional application No. 62/803,159, filed on Feb. 8, 2019.

(51) Int. Cl.
| B65G 43/08 | (2006.01) |
| B65G 43/10 | (2006.01) |
| B07C 3/00 | (2006.01) |
| B07C 3/18 | (2006.01) |
| B07C 5/36 | (2006.01) |
| B07C 3/08 | (2006.01) |
| B07C 3/14 | (2006.01) |
| B07C 5/34 | (2006.01) |

(52) U.S. Cl.
CPC .............. *B65G 43/08* (2013.01); *B07C 3/005* (2013.01); *B07C 3/08* (2013.01); *B07C 3/14* (2013.01); *B07C 3/18* (2013.01); *B07C 5/3412* (2013.01); *B07C 5/361* (2013.01); *B07C 5/367* (2013.01); *B65G 43/10* (2013.01); *B07C 2301/0016* (2013.01)

(58) Field of Classification Search
CPC ........ B07C 5/367; B07C 5/3412; B65G 43/08
See application file for complete search history.

(56) References Cited

U.S. PATENT DOCUMENTS

| 5,427,252 A * | 6/1995 | Teegarden ................ B07C 5/02 209/540 |
| 5,547,063 A * | 8/1996 | Bonnet ..................... B07C 1/02 198/370.02 |

(Continued)

*Primary Examiner* — Thomas Randazzo
(74) *Attorney, Agent, or Firm* — Fresh IP PLC; Clifford D. Hyra; Aubrey Y Chen

(57) ABSTRACT

The present invention relates to systems and methods for sorting a wide variety of packages, including, but not limited to, parcels, mail pieces, bundles, and other similar items. Embodiments of the invention specifically relate to interchangeable sorting modules with sort stations that may be used to quickly and accurately sort packages of varying shapes and sizes. Additional embodiments of the invention relate to a control architecture for operating the aforementioned interchangeable sorting modules. Such control architecture may comprise a programmable logic controller (PLC) for controlling each of the interchangeable sorting modules.

65 Claims, 12 Drawing Sheets

Module to module hand-off in the sorter sub-system

(56) References Cited

U.S. PATENT DOCUMENTS

| | | | | |
|---|---|---|---|---|
| 6,786,404 B1* | 9/2004 | Bonner | B07C 3/00 | |
| | | | 235/385 | |
| 6,789,660 B1* | 9/2004 | Bruun | B64F 1/368 | |
| | | | 198/347.1 | |
| 10,022,752 B1* | 7/2018 | Rothermel | B07C 3/08 | |
| 2002/0017537 A1* | 2/2002 | Barklin | B65G 47/96 | |
| | | | 222/240 | |
| 2003/0221935 A1* | 12/2003 | Barklin | B65G 47/96 | |
| | | | 198/357 | |
| 2007/0209976 A1* | 9/2007 | Worth | B07C 3/08 | |
| | | | 209/584 | |
| 2013/0035782 A1* | 2/2013 | Norris | B07C 3/00 | |
| | | | 700/224 | |
| 2015/0219557 A1* | 8/2015 | Skaff | G01N 21/255 | |
| | | | 702/189 | |
| 2017/0312789 A1* | 11/2017 | Schroader | B65G 47/54 | |
| 2017/0330135 A1* | 11/2017 | Taylor | G06K 7/1413 | |
| 2018/0169709 A1* | 6/2018 | Jones | B07C 5/3412 | |
| 2018/0253683 A1* | 9/2018 | Taylor | B65G 47/503 | |
| 2019/0193945 A1* | 6/2019 | Schroader | B65G 43/08 | |
| 2019/0202642 A1* | 7/2019 | Schroader | B65G 43/08 | |
| 2019/0299835 A1* | 10/2019 | Taylor | G08B 13/19613 | |

\* cited by examiner

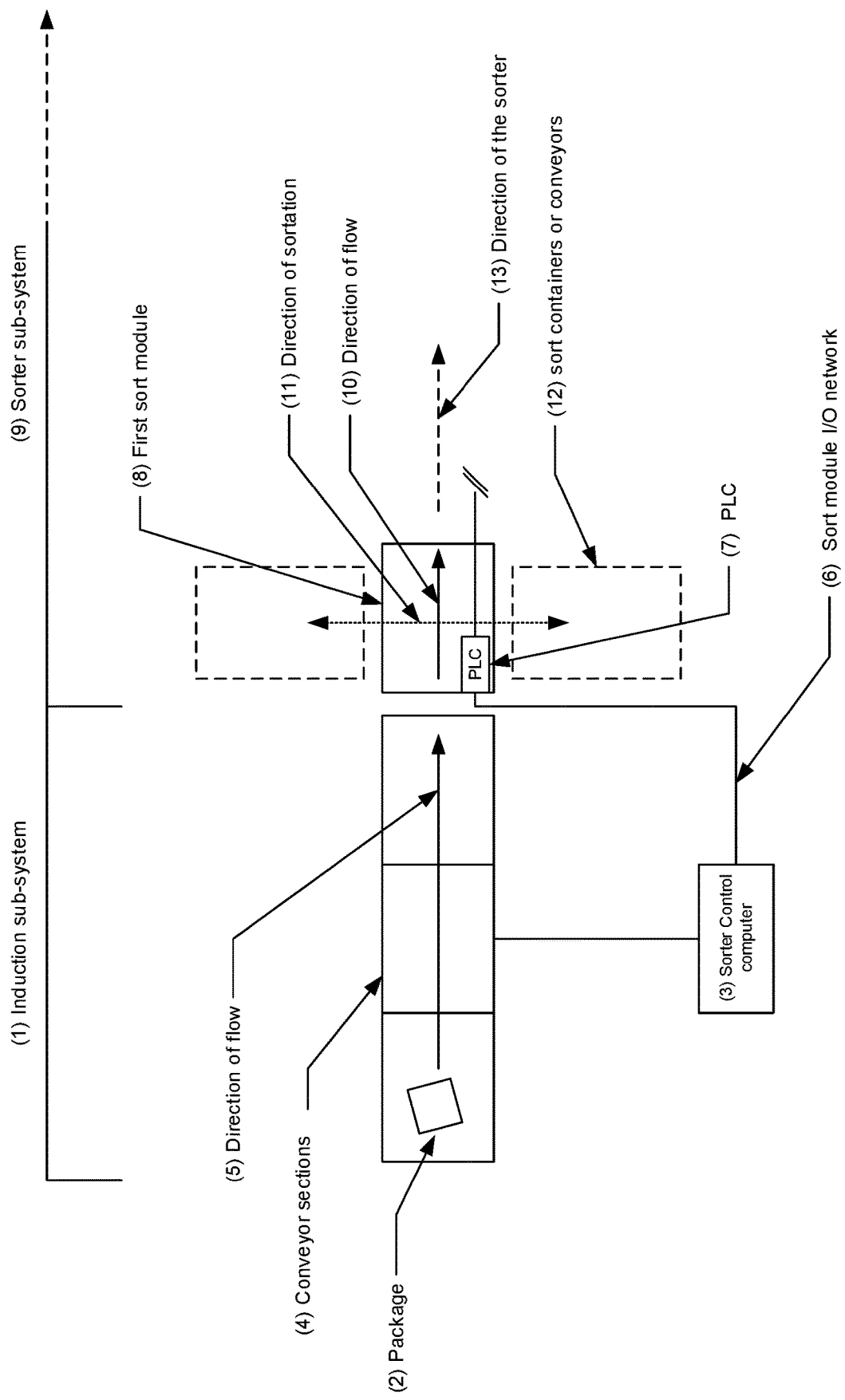
FIGURE 1 – Top level control architecture

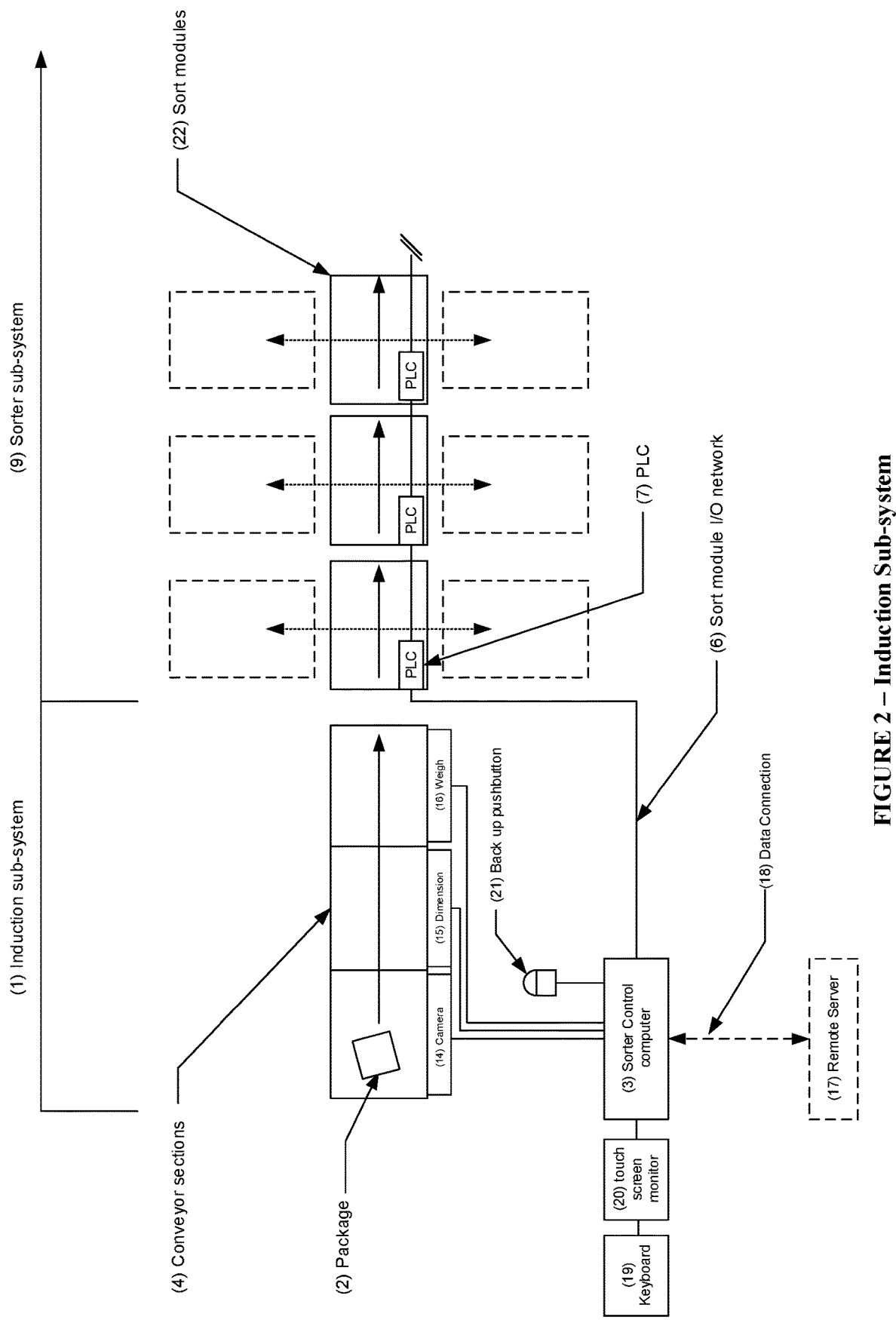
FIGURE 2 – Induction Sub-system

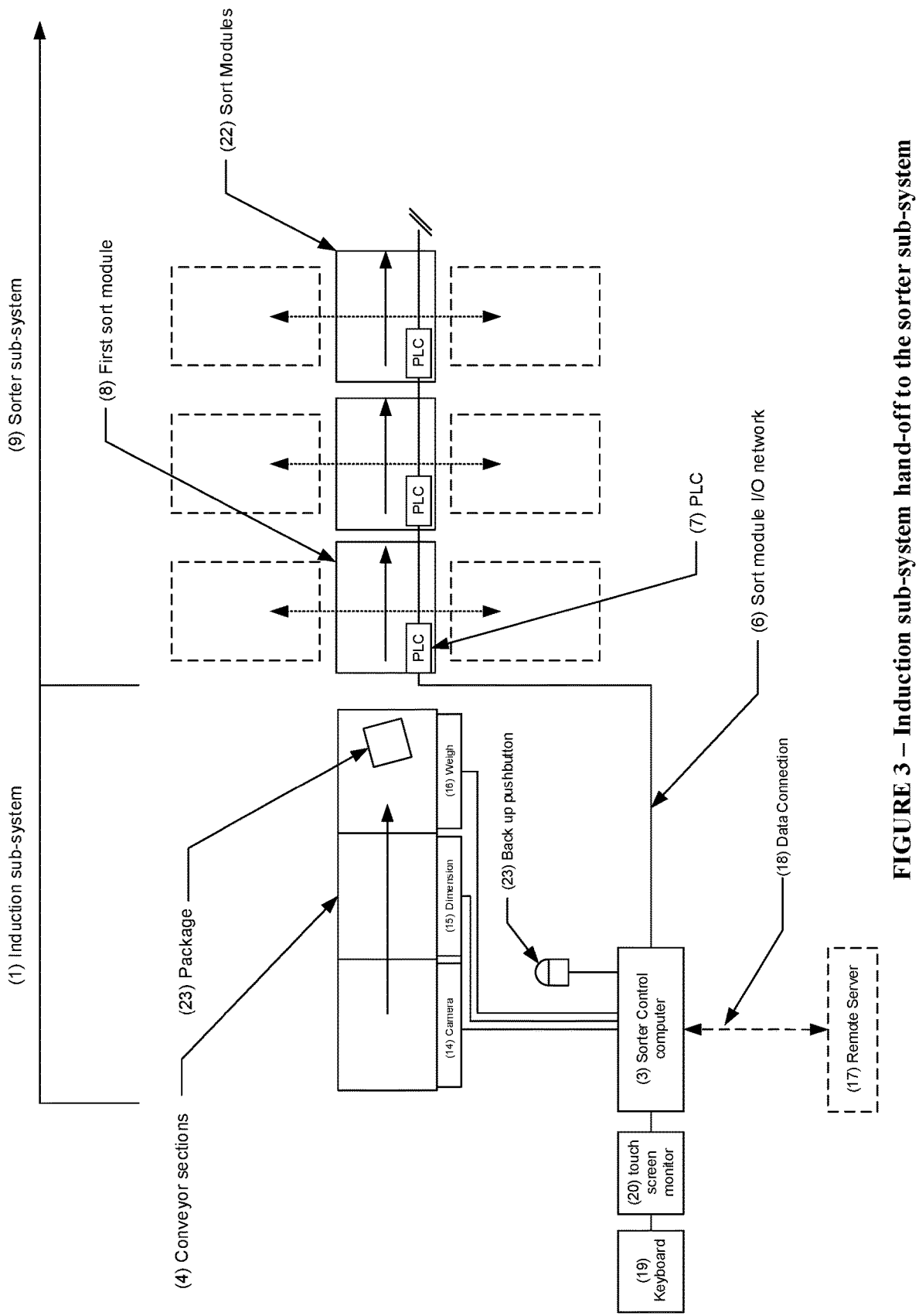
FIGURE 3 – Induction sub-system hand-off to the sorter sub-system

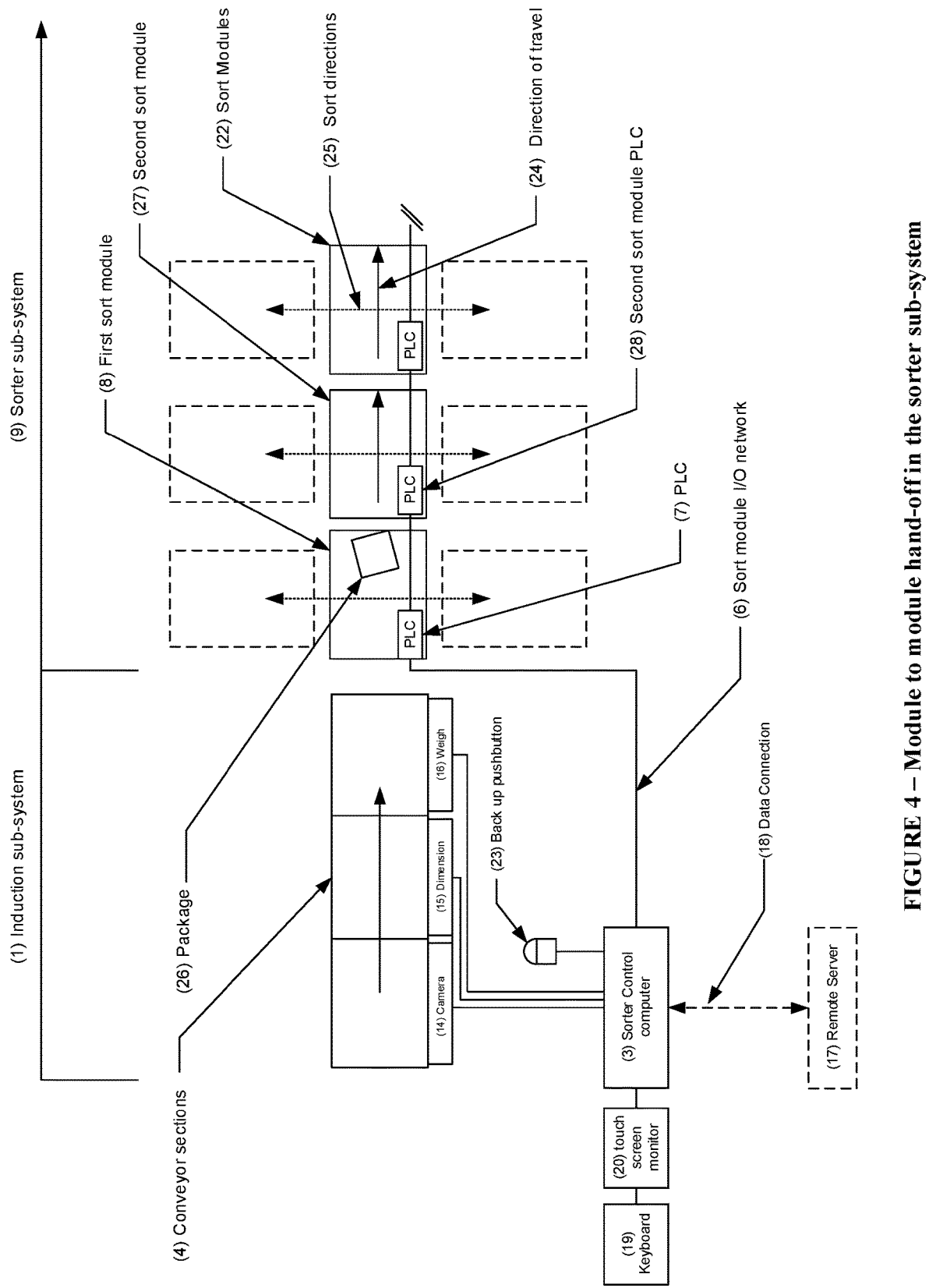
FIGURE 4 – Module to module hand-off in the sorter sub-system

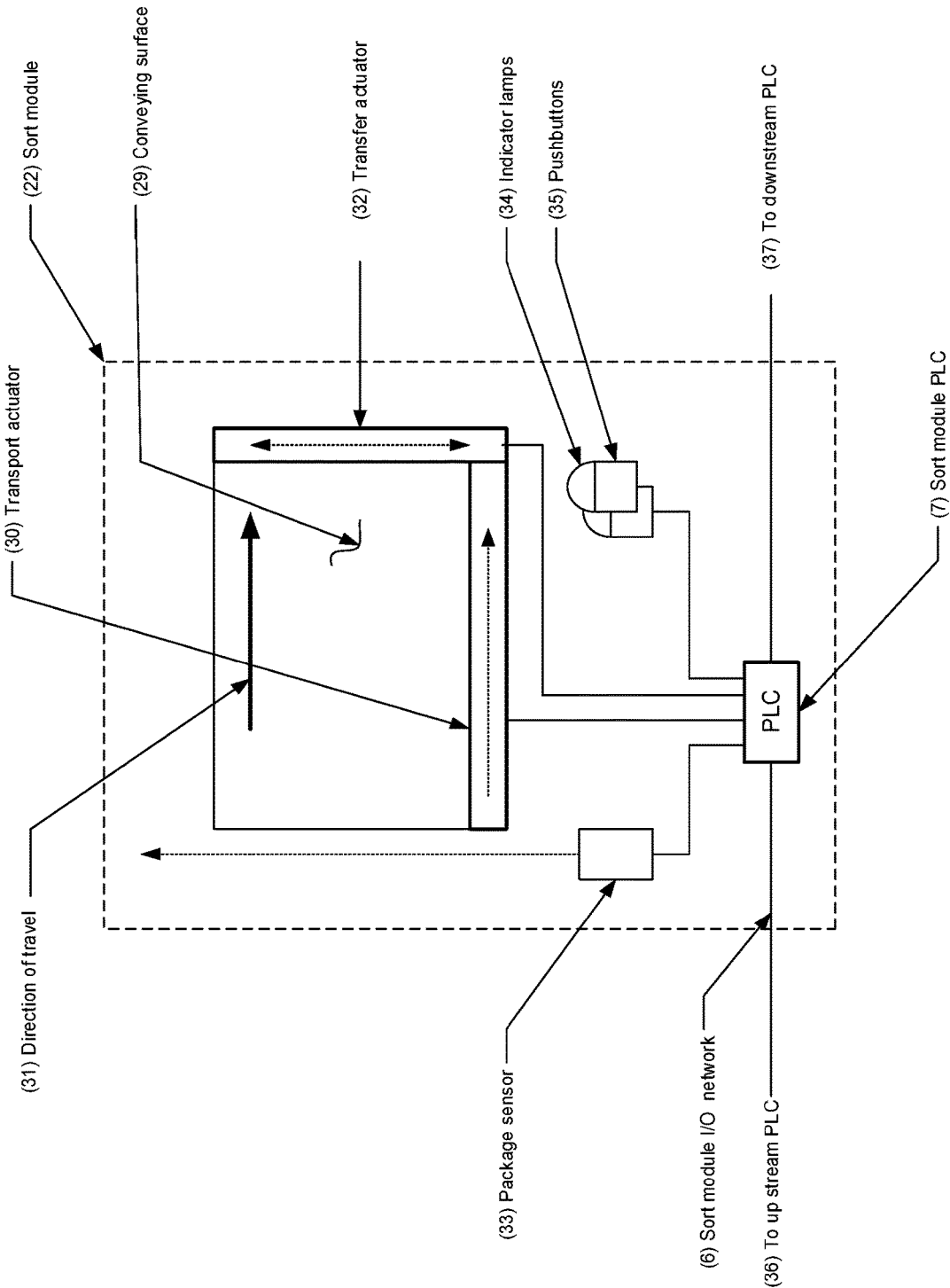
FIGURE 5 – Sort module components

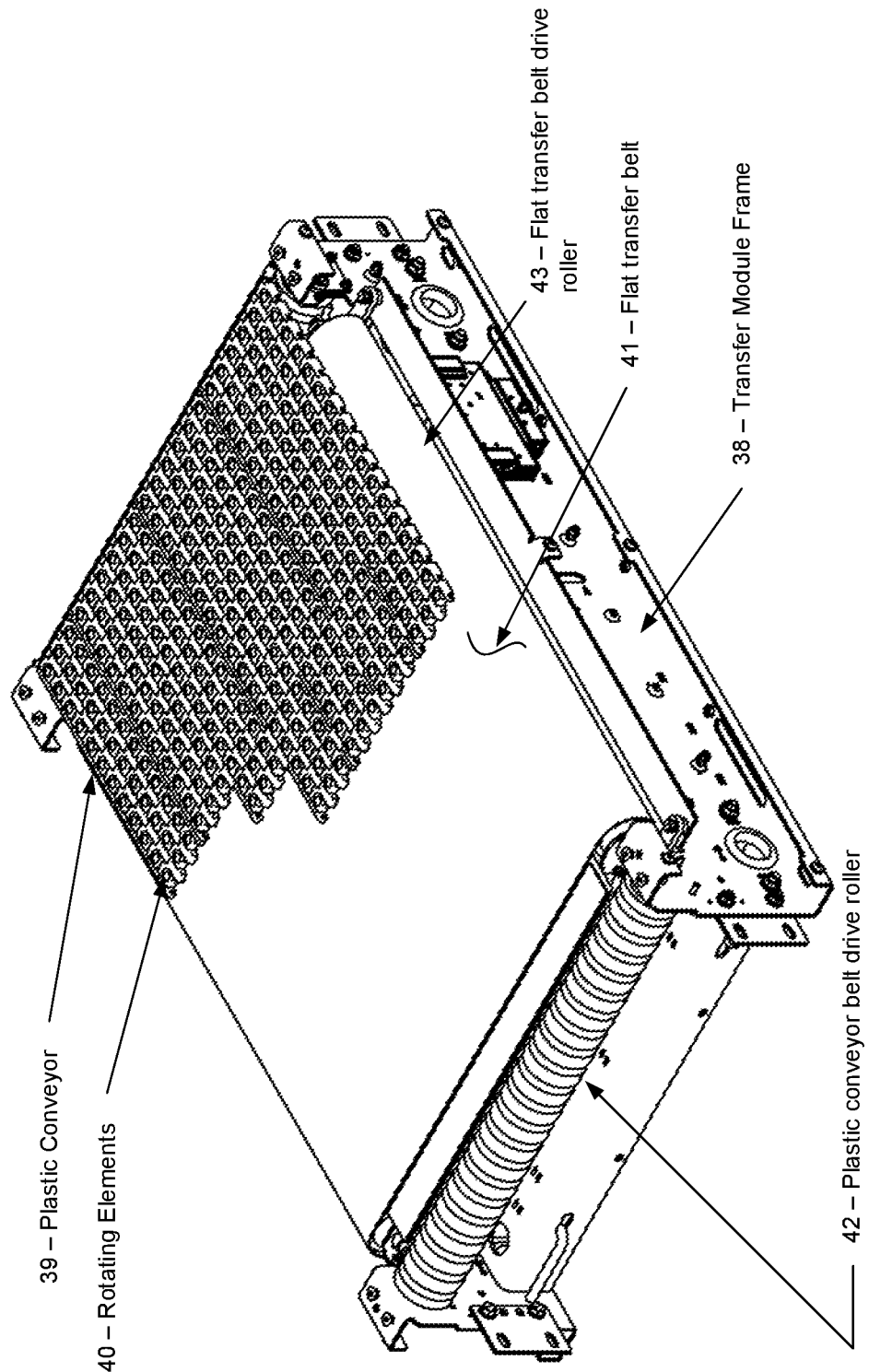
FIGURE 6 – Sample module design

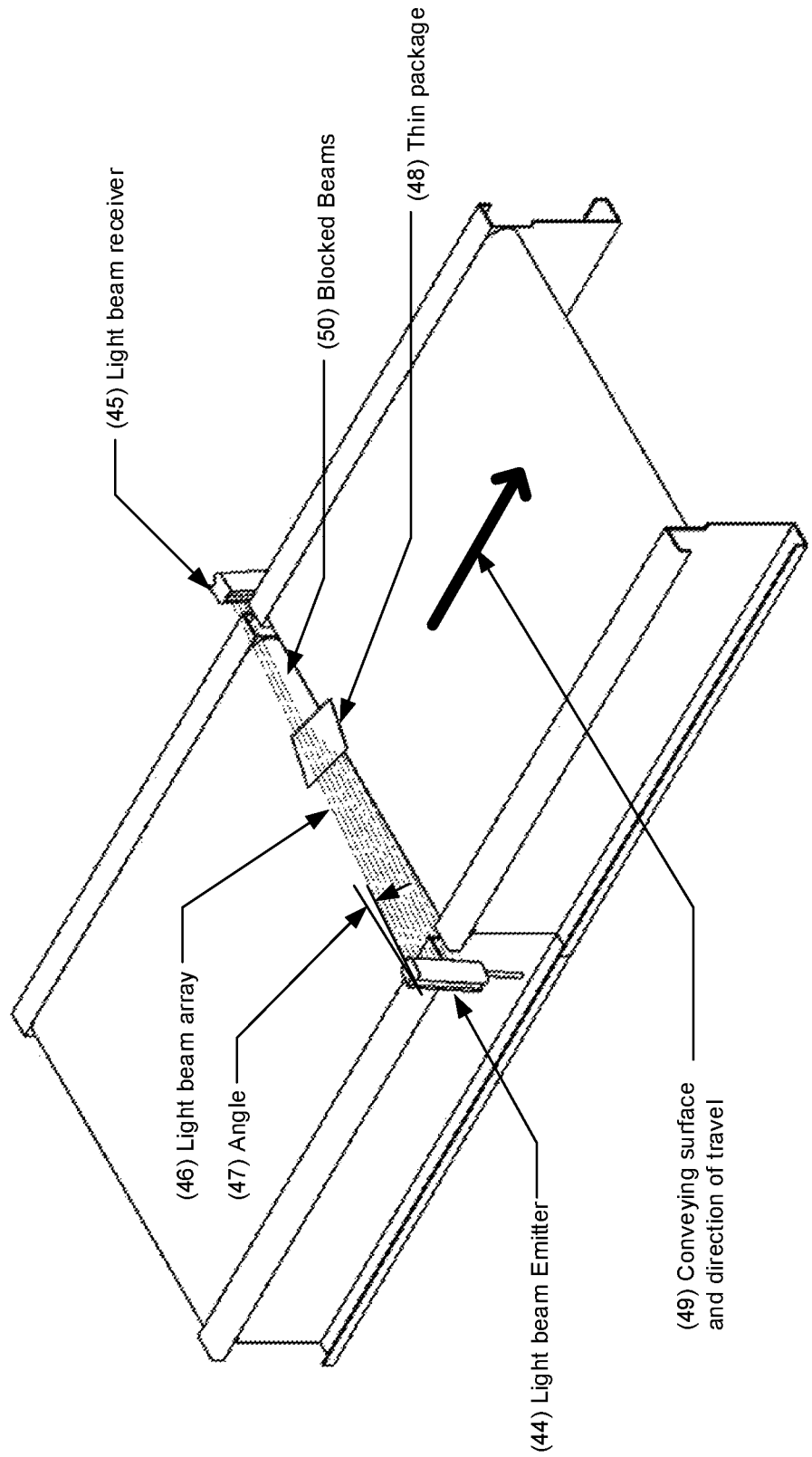
FIGURE 7 – Angled thru-beam sensor array

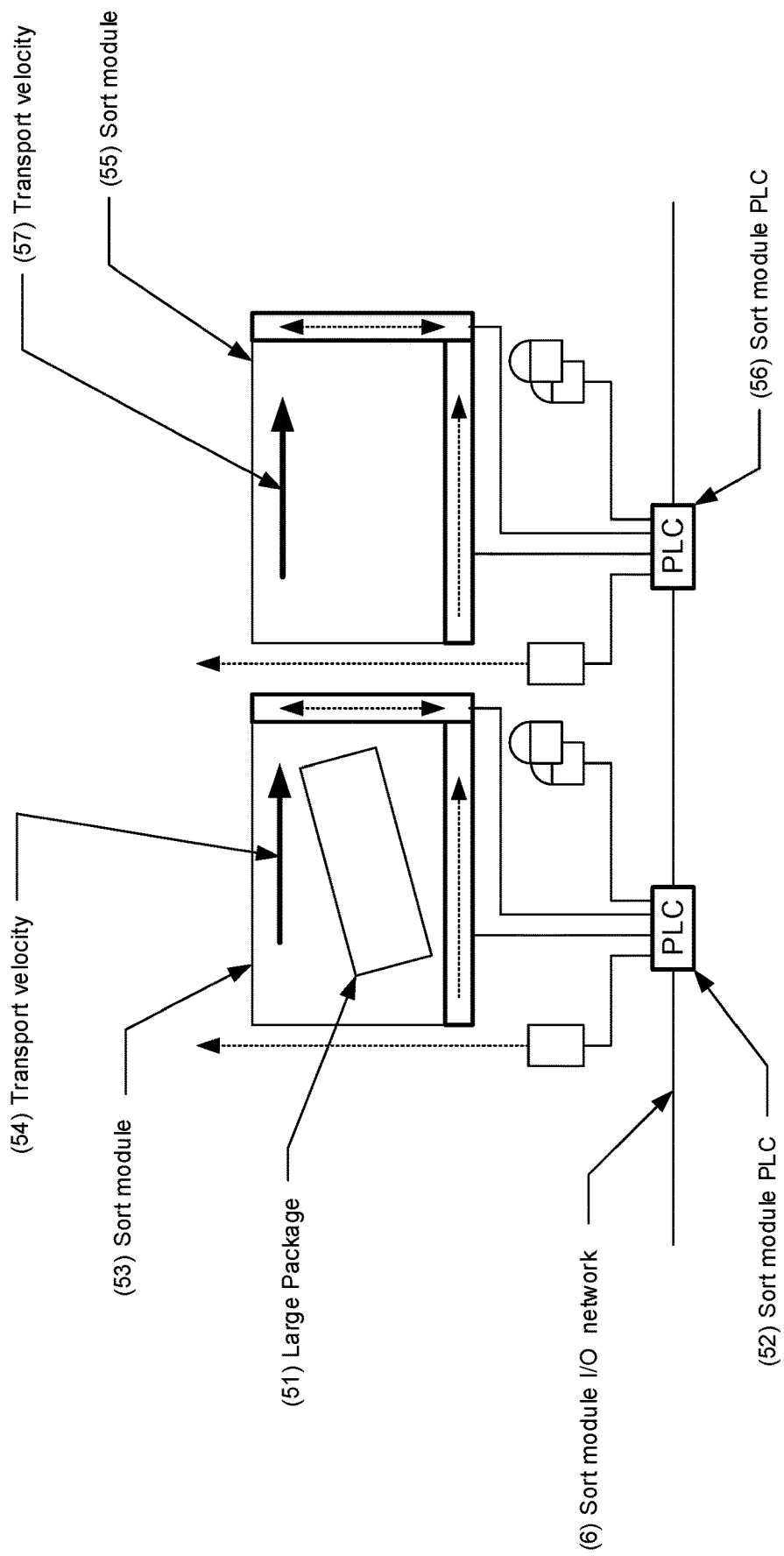
FIGURE 8 – Adaptive speed control for a large package

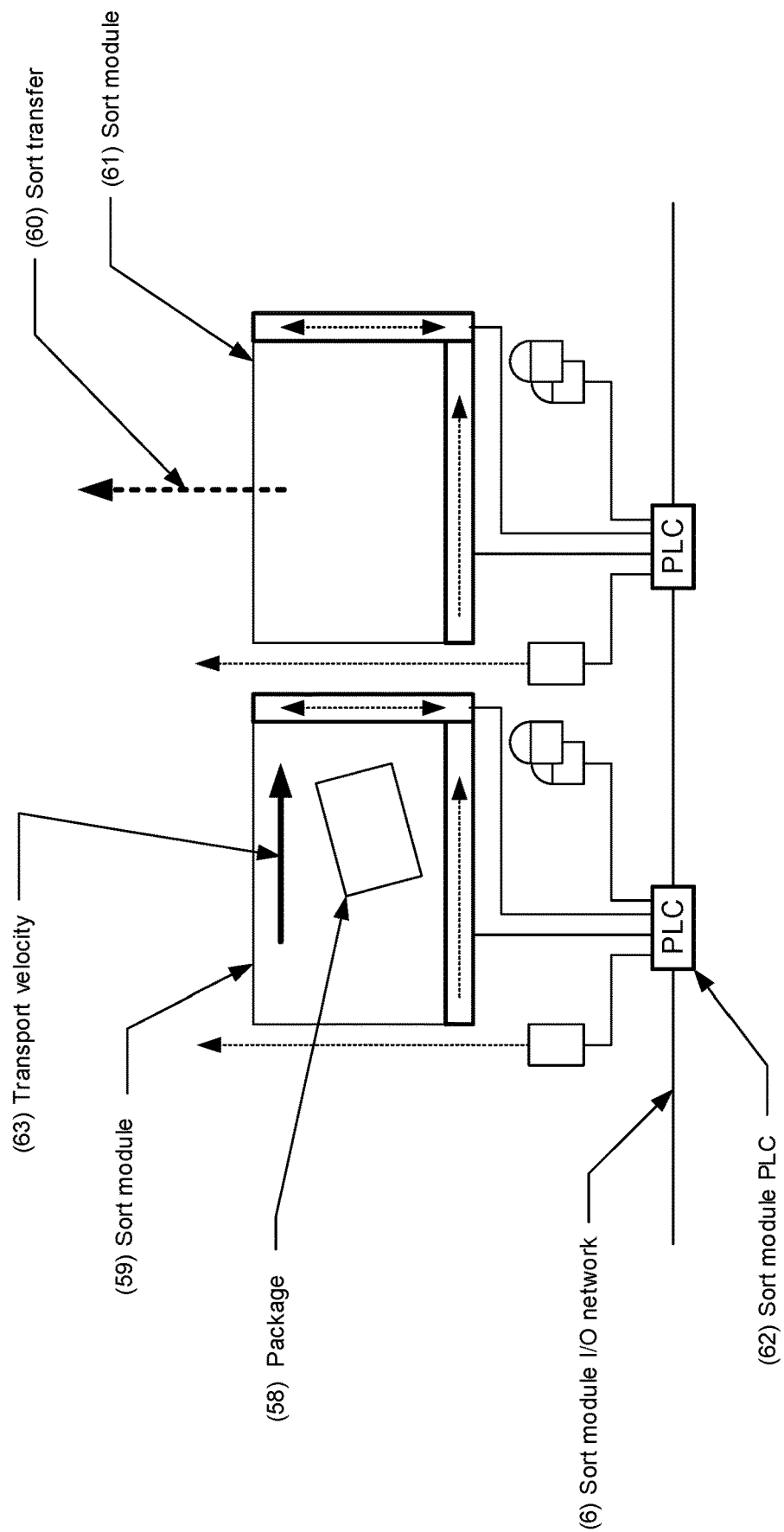
FIGURE 9 – Adaptive speed control for anticipated sortation

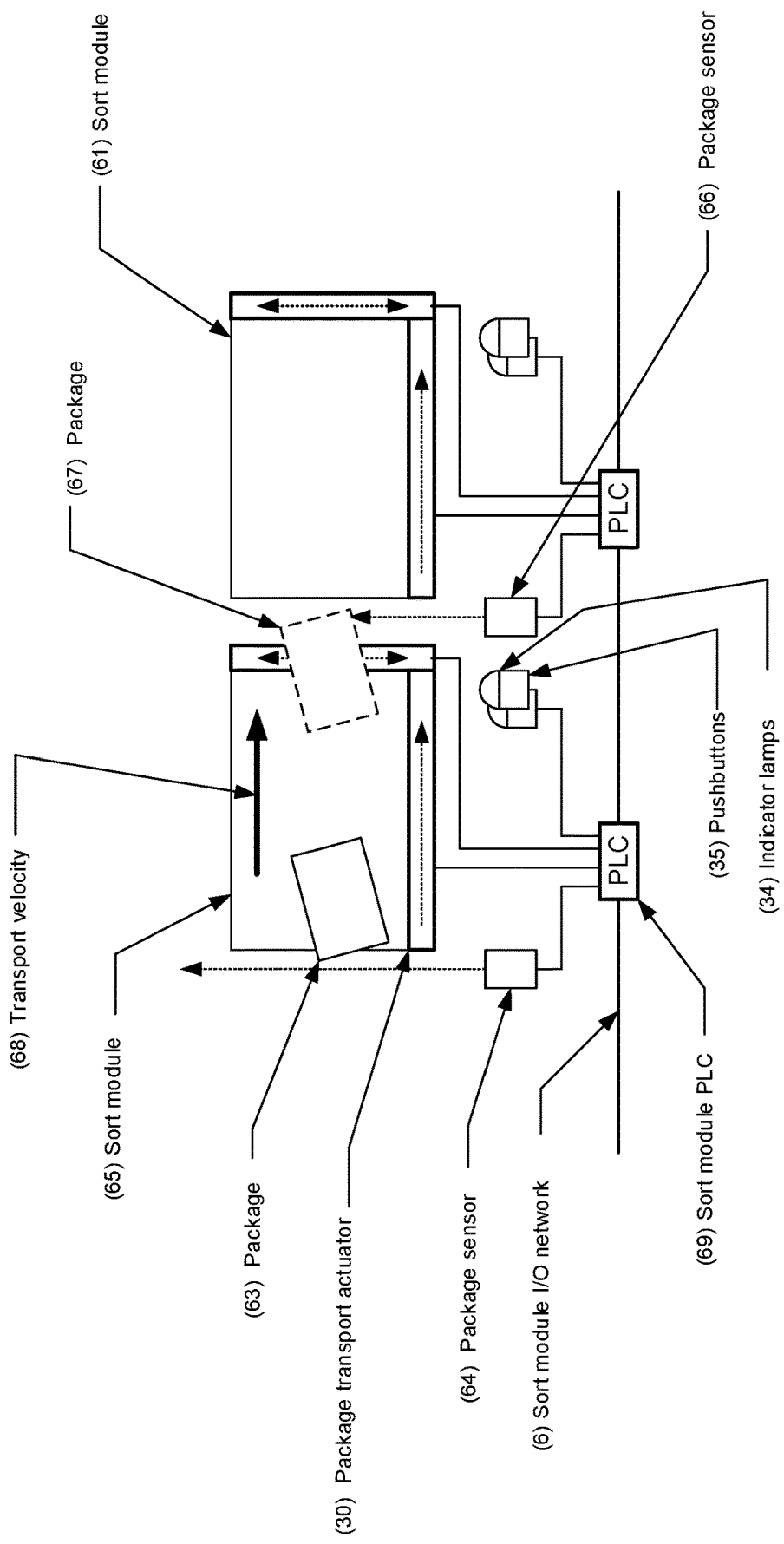
FIGURE 10 – Jam detect logic

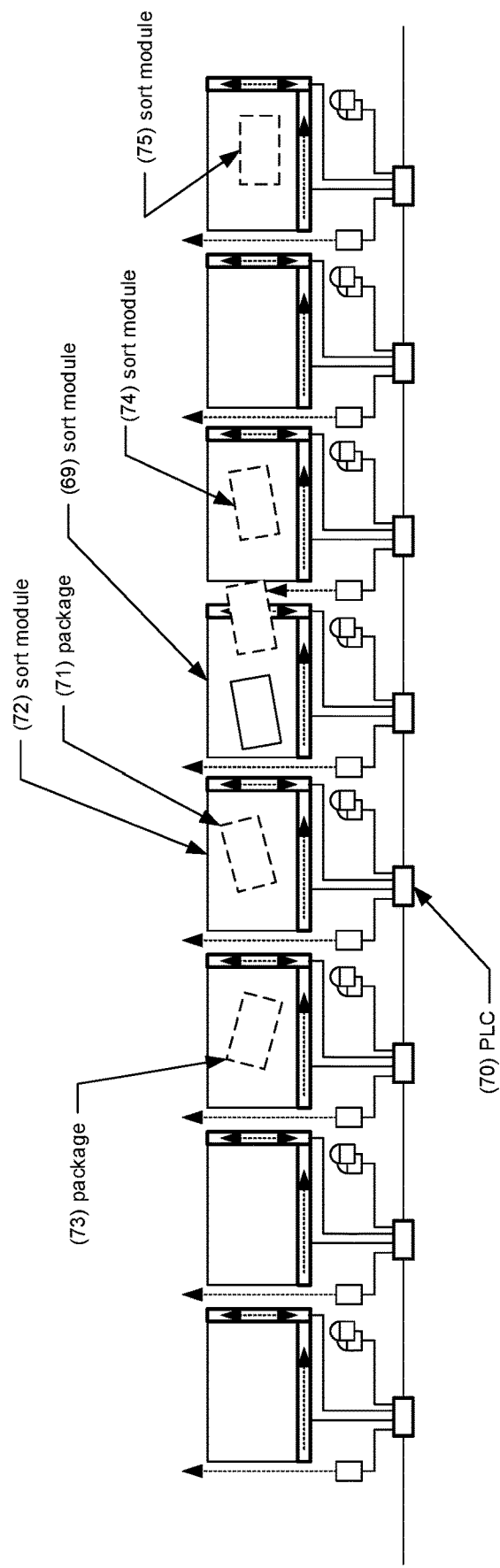
FIGURE 11 – Continuous sorting

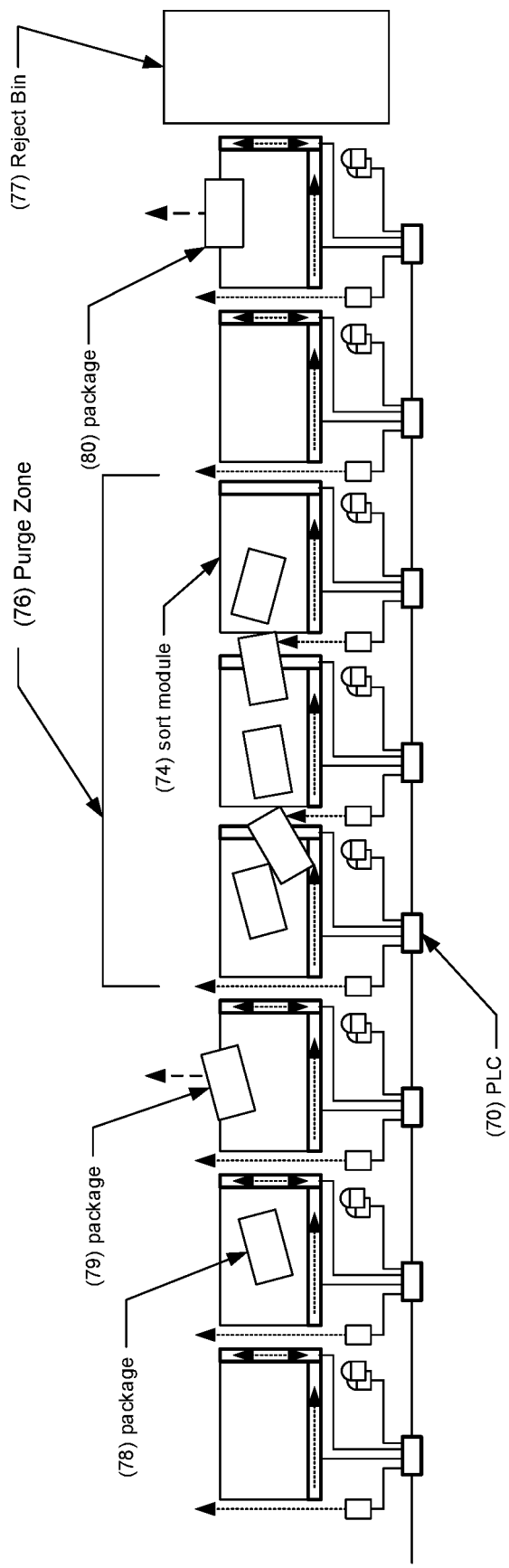
FIGURE 12 – Zone Purging

MODULAR PACKAGE SORTING SYSTEM

This application claims the benefit of U.S. Provisional Application No. 62/803,159, filed Feb. 8, 2019, which is hereby incorporated by reference in its entirety.

FIELD OF THE INVENTION

The present invention relates to systems and methods for sorting a wide range of parcels, mail pieces, bundles and other items commonly handled in e-commerce shipping facilities and distribution centers by utilizing modular product transport components. More specifically, the invention relates to a control architecture for such modular sorters.

BACKGROUND

The volume of products being sorted and transported by material handling systems is rapidly increasing in the United States and worldwide. Much of the volume increase can be attributed to the growth of e-commerce, whereby products are purchased over the Internet by consumers and businesses and delivered from fulfillment centers where individual orders are picked from shelved stock, packed and shipped directly to the purchaser, without the intermediation of physical retail stores. The majority of e-commerce shipments are below the scale of cases or pallets in size and weight.

Automatic sortation systems are a key technology enabling fulfillment centers and shipping organizations to prepare high volumes of orders for shipment and move them through a sometimes-complex physical distribution system to the purchaser. High speed, low cost, and automated operations are key attributes for efficiency and competitiveness. Two of the most common sorter types are the loop sorter and the linear sorter.

A loop sorter is typically housed in a large building and resembles a small train with multiple package-holding segments (hereinafter "cars" or "sorter trays") moving around a closed loop at speed. At one part of the loop, packages are moved onto individual cars at what are called "induction stations." The packages at any given induction station may have a variety of shapes and/or sizes. As the sorter cars move around the loop, there are a multitude of locations called "sort points" where the contents of the train can be moved off, or "sorted," into containers or attached conveyors. Various methods are used to move the product off the sorter car. Methods include tipping the car to the side, driving a transverse conveyor belt on top of the car, and dropping the product through the car via "bomb bay" doors.

Linear sorters perform the same transport and sorting function as loop style sorters. Linear sorters induct articles onto a single straight-line conveyor where all packages enter at the head of the sorter and are then expelled to containers positioned on the right or left of the sorter spine. The conveyor has features that move packages to the right or left at a precise time to discharge them into a waiting container or further conveyor designated by the sorter system. Typical discharge methods include "shoes" whereby features embedded in the conveyor move right or left to push the package off the conveyor, and "pushers" whereby a stationary actuator external to the conveyor pushes the package at the right moment off of the conveyor to the right or left.

In more recent years, a different type of sorter has been developed that utilizes a conveyor belt composed of many plastic or metal links with multiple rotating or otherwise moveable elements embedded in the conveyor belt structure. The tops of the moveable elements contact the product being transported and the bottoms of the elements contact fixed or moving features underneath the conveyor belt. When these elements touch features underneath the conveyor belt, their movement can be controlled, thus changing the movement of the article on the top surface to divert it off the conveyor. The conveyor belt can be long, e.g. a single belt for the entire sorter, or the belt can be broken into shorter sections whose actions must be coordinated to obtain the desired number of discharge points for the sorter.

New designs, e.g. U.S. patent application Ser. No. 15/916,248, filed Mar. 3, 2018, indicate how short sections of such linked belts can be used to build individual sortation modules, and multiple independent modules, each capable of moving a package off the conveyor, can be connected together to form sorters of different lengths. A sorter composed of modular units may be configured to accommodate varying initial sort point and package size requirements, and modules can be readily added or removed to accommodate changing needs.

SUMMARY

It is to be understood that both the following summary and the detailed description are exemplary and explanatory and are intended to provide further explanation of the invention as claimed. Neither the summary nor the descriptions that follow is intended to define or limit the scope of the invention to the particular features mentioned in the summary or in the description. Rather, the scope of the invention is defined by the appended claims. In certain embodiments, the disclosed embodiments may include one or more of the features described herein.

A new modular package sorter system combines a standard induction sub-system with standardized sortation modules that are economical to manufacture in quantity, thereby resulting in the configuration of different sized sorters. A distributed controls architecture and control software is the same for any size of sorter. Supervisory control software runs on a computer in the induction sub-system while a programmable logic controller (PLC) is incorporated with each sort module and controls the operation of each sortation module locally. The individual PLCs are programmed with identical control and communications features. Each sortation module runs independently, yet coordinates the transition of packages between one another. Each sortation module has local adaptive control features that can dynamically change speeds, detect jams, or respond to operator inputs independently without affecting adjacent modules or burdening the supervisory control system. Collectively this provides a robust sorting solution that is scalable, cost-effective, reliable, and fault tolerant.

A new low-cost package sorter system design has a modular construction and a distributed control architecture. It is to be understood that a wide variety of items may be sorted by systems according to various embodiments of the present invention, and that the term "package" is not meant to be limiting. Everywhere the term "package" is used, the term "object" can be substituted. The term "packages" refers to mail packages, which may be a wide variety of different shapes and sizes. Mail packages typically have information, particularly destination information, encoded in some machine-readable form, typically a bar code. However, embodiments of the invention are useful for objects without machine-readable destination information, for example where destinations are ascertainable according to programmed logic depending on characteristics of the object that can be determined by a computer or entered manually. For example, a meat processing plant might use such a system, where destination is determined based on the size, shape, and/or animal origin of a cut of meat, which information may be entered manually and/or detected automatically. The sorter system in embodiments has two main sub-systems: the induction sub-system and the sortation sub-system.

The induction sub-system is where packages are introduced to the sorter. This sub-system is standardized for all sorters regardless of length or number of sort points. All induction systems use the same electronic components, interconnect cabling, wiring, and support documentation. Standardized mechanical configurations make this sub-system low-cost to manufacture. The control software also does not change with requirements for different sized sorters with different numbers of sort points.

The sorter control computer and system software is located in the induction sub-system and provides overall control of the sorter system to start up, shut down, manage the sort schemes, control the I/O bus, and interface with the data collection systems for the induction of packages. Sort schemes are rules that relate package sortation points to package data and may be for example a table of correspondence that relates package data, particularly destination address, to sort point destination, so that packages are sorted to trucks (via their sort point destinations) that service routes in the area of their destination addresses. These sort schemes can change even within a day, for example mail trucks may be divided into morning and afternoon routes and the sort schemes may change accordingly.

A display screen and keyboard at the sorter control computer provide the human machine interface (HMI) to operate the sorter, update sort schemes, and manage sorter operations. For example, an operator can turn the system on or off (e.g. between standby mode and operating mode), read log files and other records, for example to see how many packages were sorted to different points, average package weight, how many jams or other errors were reported and where in the system, fault codes, etc. Typically when an error or other alert condition occurs, this will be reflected on the display and an operator can address the issue from the HMI, although operators may also be able to determine and address the problem using local controls such as buttons/switches and indicator lamps at other locations in the system.

The conveyor components in the induction sub-system are controlled by the sorter control computer to move the package through a series of stations to read package address information, determine dimensions, and weigh the packages. The sorter control computer collects the package information and determines to which sort point destination on the sorter the package should be transported.

Once the package sort point destination is determined, the sorter control computer prepares a data set specific to the package and sends this data to the first of a string of Programmable Logic Controllers (PLCs) that are installed in the series of sort modules that comprise the sortation sub-system. The PLCs control the operation of the sort modules, alone or in conjunction with the sorter control computer. The sorter control computer uses this data set to hand off the transport control to the series of PLCs formed by the string of sort modules. Although in a preferred embodiment, each sort module comes with its own local PLC, in some embodiments a PLC may control a small group of sort modules, or a single sort module may have more than one PLC to control expanded functionality of the module.

Although PLCs are well known and used throughout as the preferred example, other controllers known in the art may also be used for the same purpose. It should be appreciated that a variety of computing devices may operate as controllers, and that controllers, as well as the control computer, may include hardware, firmware and/or software. Generally, the configuration of a controller, control computer or other computing device may refer to particular logic embodied in hardware, firmware, and/or software. In other words, a controller or computer device may be configured to provide a certain functionality by providing appropriate logic programmatically with software, or embodied in hardware/firmware. Configurations of controllers described herein may therefore refer to logical modules of the controllers that may be combined with other modules or divided into sub-modules despite their physical organization or storage. Where particular functionality is attributed to a controller or control computer, it may be effectuated by hardware, firmware, software or a combination thereof. Such software may be a collection of software units, possibly having entry and exit points, written in a programming language, such as, but not limited to, SWIFT, Objective C, Java, Lua, C, C++, or C #. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors.

Controllers as referenced herein may in various embodiments be entirely local, entirely remote, or a combination thereof, and may use one or multiple processors and hardware located in one or more locations, locally and/or remotely. The logic used to govern the configuration and operation of the controllers and control computer(s) can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or solid state storage devices); and (iii) information conveyed to a computer by a communications medium, such as through a computer or telephone network, including wireless communications.

The latter embodiment specifically includes information downloaded from the Internet and/or other networks. Such signal-bearing media, when carrying computer-readable instructions that direct the functions of the present invention, represent a part of embodiments of the present invention. In general, routines executed to implement the embodiments of the invention may be part of an operating system or a specific application, component, program, module, object, or sequence of instructions. Software disclosed may comprise variables and data structures that either reside locally to the program or are found in memory or on storage devices.

Each of the processes, methods, and algorithms described herein may be embodied in, and fully or partially automated by, code instructions executed by one or more computing devices or computer processors comprising computer hardware. The processes and algorithms may be implemented partially or wholly in application-specific circuitry.

Some actions described herein may be automated to a greater or lesser extent, according to algorithms and/or preset operator preferences. Therefore, it is to be understood that where an action is shown or described as being performed by an operator, in various implementations and/or circumstances the action may be performed entirely by the sorter control computer or sort module controller(s) or by the operator, using the sorter control computer or another computing device to a greater or lesser extent (e.g. a user may type out instructions, or may choose from preselected options generated by the control computer). Similarly, where an action is shown or described as being carried out by the sorter control computer and/or a controller, the action may be performed autonomously by that computing device or with more or less user input, in various circumstances and implementations.

It is to be understood that the sorter control computer can be implemented in various known ways in different embodiments of the invention. For example, the sorter control computer may be implemented as any kind of computing device, in a single device or distributed over multiple devices (including a cloud). The sorter control computer may be primarily remote or primarily local, and may be interfaced primarily locally via inputs such as keyboard and display, or primarily remotely via an app or other software. The sorter control computer, and any part thereof, may be placed at any position, near or far from the induction subsystem and sort modules. The sorter control computer may have multiple local interfaces (e.g. keyboard, mouse, display) at different physical locations, may have both local and remote access points, etc.

The sortation sub-system is formed by a series of sort modules that are physically connected together end-to-end. Each sort module has a conveying surface with a method to convey the product to the next sort module, and another method to transfer the product off of the sort module and to the right or left to sort the package into a waiting container or package transport device. A package transport device may be a conveyor, skate wheel, or any other known material handling transport device, or even another sort module. In some embodiments sort modules may be positioned side to side, although generally not in the most typical implementations. In many applications, a package sorted off a sort module to the left or right is out of the sort module system once exiting off the side of the sort module. Each sort module has its own PLC that provides local control for the mechanical operation of the sort module and communicates with both the neighboring upstream and downstream sort module PLCs. The same PLCs also communicate with the sorter control computer located in the induction sub-system under a separate protocol to provide status information about each module and relay operator inputs from touch buttons and indicator lamps.

In some embodiments touch buttons and indicator lamps are combined in a touch lamp button which may be essentially a push button with an integrated LED or other light. Lights may be used to indicate issues at that section of the sorter, for example a slow flash for a container getting full, a fast flash if a jam is detected and the sorter stopped as a result. Any known indicator lights can be used and, for example, information may be conveyed based on the color of light as well as whether the light is flashing or solid and if flashing, the frequency. The buttons are input devices for the operator(s), typically a simple push button may be pushed to take the associated sort point offline in order to change the container used to receive packages at that sort point, and pressed again to put that sort point back in service and turn off the (for example) slow flashing light that was indicating a container approaching full capacity. Use of the button may be similar for a jam in which the sort module has been stopped. The material that is jammed may be poked out of the way by an operator, who then touches the button to indicate clearance of the jam and resume operations of the sort module. In a typical embodiment, operators can control individual local sort modules directly with their associated buttons, or remotely from the sorter control computer, such that there is a mixed local-global control architecture. Each sort module's PLC controls the same sort module's buttons/lights, but an operator may send a message from the sorter control computer to the local PLC to turn off the light, restart the module, etc. and the PLC similarly, if the buttons are operated locally, will relay that back to the sorter control computer.

The data set prepared by the sorter control computer is communicated to the first PLC of the sort modules as the package enters the sorter sub-system. Typically, entry of the package into the sorter sub-system is determined using though-beam array sensors located before each sort module as described in detail below. These sensors detect each package as it proceeds onto the sort module, and can determine the leading and trailing edge of each package and when the edges cross the through-beam array. Speed of the conveyors, and therefore packages, is known from motor encoders, although the through-beam array may also be used to determine speed of the package. Package speed may assist with, for example, discharge from the sort module to sort points. For example, package length and module length may be used to determine whether package speed should be adjusted to improve discharge reliability and/or reduce jam risk, as described in more detail below. The PLC in each sort module receives the data set for the incoming package from its upstream neighbor. Based on the data, the PLC will execute the program to pass the package to the next sort module, or discharge the package to right or left side sort points. If the package sort point destination is further down the sorter, the data set will be sent to the next downstream module PLC and the process will repeat itself until the package reaches its intended sort point destination. In many embodiments, all sort modules are identical, and each has its own PLC, set of sensors, indicators, pushbuttons, and motors (for example as described in detail herein). Identical sort modules allow for very efficient manufacturing and low cost, while retaining flexibility. For example, depending on space constraints it might be desired for the sorting sub-system to make a turn, which can be accomplished for example by inserting a "pie-slice" roller or conveyor section in-between sort modules. In some embodiments, the sort modules may be identical except for size, and for example smaller sort modules might be used in particular locations such as at the end of the sorting sub-system to better handle smaller packages. In general, sort module size may be selected based on the objects to be sorted. A local power supply may be connected to the overall power distribution system and able to provide local DC power to one or several modules.

The common design and construction of the sort modules lowers manufacturing costs since all modules are the same, regardless of the sorter size. The distributed control architecture allows each sort module to be self-controlled and includes a standard protocol for communication to adjacent modules, handing off packages between modules, and status communications with the sorter control computer. Adding or subtracting additional modules does not affect the other modules or the sorter control software, and only requires a change in configuration settings.

The common PLC program that is installed in each of the sort modules includes many adaptive subroutines that can be activated by the data set associated with each package. These adaptive features increase the overall performance and reliability of the sorter system. Non-limiting examples include: how the timing or speed of the sort module functions is changed based on the length of the package; and how the transport speed of a sort module may be changed based on the sort point destination and anticipation of desired operation in the next downstream sort module.

The speed of each sort module can be controlled by its respective PLC. To reduce jams, when a large package is identified that might be difficult to discharge to either side or stop within a single module due to its momentum and sliding, the transport speed of the module that package is on may be slowed down without slowing down the other modules, allowing for reliable transfer. In embodiments, if a package slides too far and crosses a through-beam array (or other) sensor between modules when it was supposed to have been discharged to either side or stopped, the system notes an unexpected package and signals a jam. By slowing down the sort module prior to the module where the large package is to be sorted out of the system, the system can reduce the chances of the package sliding past its intended sort point to a subsequent module, which would cause a jam and in most implementations require manual processing of the package to get it back on track to its sort point. This is a very important feature of a modular system which makes it far more reliable than a conventional single-conveyor system in which the entire system is driven at the same speed all the time.

Note that the package length can be calculated from the time between leading edge and trailing edge detection by a through-beam array or by imaging or other data capture in the induction sub-system. In some embodiments, package weight, for example gathered in the induction sub-system, may also be used to trigger a slowing of sort module transport speed. In any event, length of a package relative to length of a sort module is a very important factor, since it determines the amount of travel distance a package has before it will extend off the end of the sort module.

Parameters for when sort modules are slowed and to what speed may be pre-set based on characteristics of a given system and/or objects to be sorted, but may also adapt over time using known AI techniques. Jams and their locations are logged and where jam frequency is relatively high, sort modules speeds are reduced to test whether that reduces the jam frequency. If reducing speed is found to reduce the number of jams, speed may be slowly decreased until e.g., jam frequency is within 10% of the system average, or overall throughput is maximized (i.e. if below a certain speed the number of objects being successfully sorted per unit time goes down, speed is increased again to find the optimum). By way of example, if furniture varnish spills on one sort module and reduces the coefficient of friction of the conveyor surface, that sort module will experience a higher frequency of jams which the system will identify, reduce the speed of the sort module and bring the jam percentage back in line with the other sort modules. This is a large improvement over conventional sorting systems with single speeds.

In some embodiments, each sort module starts when the sensor located in the gap immediately before the module detects the leading edge of a package. Packages will pass over a sort module without stopping if not being sorted off the side to their sort point destination from that sort module and if the next sort module is clear and ready to accept the next package. The sort module will continue to run and transport the package to the downstream sort module and stop running when the sensor at the beginning of the downstream sort module sees the trailing edge of the package.

However, if the next module is not clear, the package will have to stop before entering the next module. In this case the first sort module will start as before when the entrance sensor detects the leading edge of a package. However, the sort module must stop the package before blocking the entrance sensor of the downstream sort module. To stop the package in time, the same sensor that detects the leading edge of the package is also used to detect the trailing edge of the package and signal the sort module to stop.

The available stopping distance is a function of the length of the package and the length of the sort module. For example, if the sort module is 40 inches long, and transporting a 10 inch package at 40 inches per second, the package will have 30 inches, or ¾ seconds before it is at the end of the sort module and is detected by the entrance sensor to the next sort module. Based on package types, ¾ of a second, or 30 inches, may be sufficient time for a 10 inch long package to be stopped.

Larger packages decrease the available stopping distances and times unless compensations are made. As an example, if the same sort module is 40 inches long, and transporting a 20 inch package at 40 inches per second, this package will only have 20 inches, or ½ second to stop after the trailing edge clears the entrance sensor. This may not be enough time or distance for the package to be stopped, if it is required to be stopped, before moving to the next sort module. Insufficient stopping distances and times will cause excessive jams, decreasing the overall throughput of the sorter.

Rather than slow down the overall sorter, adaptive features of the program running on the PLCs of the sort modules may be used to slow the transport speed of the sort module only when needed for a larger package. In this example, the PLC of the sort module knows that the package is 20 inches long (as determined at induction of the package and/or by the sensors). Based on pre-programmed values, or machine learning, the PLC knows 40 in/s is too fast for a desired operating reliability. The PLC therefore slows the transport speed of the module to 20 inches per second, giving the 20 inch package 20 inches or a full 1 second to come to a stop, if it is required to be stopped before moving to the next sort module. A slower transport speed for large packages also increases the reliability of diversion of large packages off the sorter at the sort point destination module.

The ability to dynamically adjust the speed of a sort module based on the size of the package is an adaptive control feature that allows the sorter to run at a maximum speed and throughout for most packages, yet slow down when required for larger packages to avoid jams and increase reliability Other features in the PLC program common to all sort modules may include the ability to detect jammed packages or lost packages and communicate status information between the individual sort modules and the supervisory sort computer.

In normal operation, since a PLC will not give the go-ahead to the previous sort module until its conveyor surface is clear, no more than half of the sort modules will have a package at any given time (although in case of a jam that stops a sort module and creates a backup behind the jammed sort module, packages may "line up" behind the stopped sort module, with a package on every sort module), and no more than half of the sort module conveyor surfaces will be operating at any given time (at least in a non-discharge direction). As a direct consequence, the sorter in such embodiments generates at most only half the noise of a non-modular sorter, and wear-and-tear on sorter transport surfaces and mechanical systems is significantly reduced. As many as half the sort module conveyor surfaces would be running only in very high-volume situations (and often not even then), which are relatively rare in most sorter implementations (or in rare "purge" scenarios described below, in which more than half the sort module conveyor surfaces may run at any one time). At other times, significantly less than half of sort module conveyor surfaces would be running at any one time. For example, an operator may throw a few packages on the sort system, go back and grab a few more packages and throw them on, etc. In such scenarios, only a few sort module conveyor surfaces may be running at any one time. Sort modules towards the end of a linear sort system in particular see very low volumes and run very rarely. As such, noise and wear-and-tear are reduced by much more than half in most operational situations, as compared to sort systems with a single long (non-modular) conveyor surface.

Note that this control rule of stopping a sort module conveyor surface when the next downstream sort module is not clear is a very simple rule that results in high reliability with the modular sort system. However, in other embodiments a higher throughput may be achieved for high volume sorting by relaxing the rule of stopping packages until the next sort module is clear. For example, where a package on the next downstream sort module has a leading edge that has been detected passing the sensor just after the next downstream sort module (i.e. before the subsequent downstream sort module after the next downstream sort module), it might be anticipated that package will shortly clear the next downstream sort module and pass fully onto the subsequent downstream sort module. As such, a package may not be stopped, but rather the sort module may continue to run and allow the package to proceed on to the next downstream sort module based on the anticipation that the package thereon will exit that next downstream sort module soon. Such logic may be implemented in some embodiments only when a high volume of packages is detected, and/or when reliability is not expected to be adversely affected, at least beyond a certain threshold level.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 1 is a diagram illustrating a top-level control architecture, according to an embodiment of the present invention.

FIG. 2 is a diagram illustrating an induction system, according to an embodiment of the present invention.

FIG. 3 is a diagram illustrating an induction system hand-off to the sorter sub-system, according to an embodiment of the present invention.

FIG. 4 is a diagram illustrating a module to module hand-off in the sorter sub-system, according to an embodiment of the present invention.

FIG. 5 is a diagram illustrating sort module components, according to an embodiment of the present invention.

FIG. 6 is a diagram illustrating a sample module design, according to an embodiment of the present invention.

FIG. 7 is a diagram illustrating an angled thru-beam sensor array, according to an embodiment of the present invention.

FIG. 8 is a diagram illustrating an adaptive speed control for a large package, according to an embodiment of the present invention.

FIG. 9 is a diagram illustrating an adaptive speed control for anticipated sortation, according to an embodiment of the present invention.

FIG. 10 is a diagram illustrating a jam detection logic, according to an embodiment of the present invention.

FIG. 11 is a diagram illustrating continuous sortation, according to an embodiment of the present invention.

FIG. 12 is a diagram illustrating zone purging, according to an embodiment of the present invention.

DETAILED DESCRIPTION

This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may affect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 provides an overview of the top-level control architecture of the sorter design to illustrate the distributed control architecture between the induction sub-system and the sorter sub-system.

The induction sub-system (1) is where a package (2) enters the sorter. The sorter control computer (3) controls the conveyor sections (4) of the induction sub-system to move the package in the direction of flow (5). The sorter control computer collects information about the package, determines its sort point destination, and creates a data set specific to each package. The data set is sent over the sort module I/O network (6) and delivered to the first PLC (7) that is resident in the first sort module (8) of the sorter sub-system (9). Each subsequent sort module in the sorter sub-system is identical to the first sort module and has its own PLC to move the package in the direction of flow (10) or to move the package in the direction of sortation (11) to waiting sort container (12) or conveyors. The data set and the package are transferred sequentially through each sort module PLC in the direction of the sorter (13) until the package is sorted and the sortation is complete for that package. The sorter sub-system (9) can be extended with additional sort modules without impacting the induction sub-system (1) or the sorter control computer (3).

FIG. 2 describes the details of the induction sub-system (1) where the sorter control computer (3) provides supervisory control for the sorter system and interfaces with the different hardware systems to scan, weigh and dimension the package. The sorter control computer (3) controls the individual conveyor sections (4) to transport the package (2) through the induction sub-system. The sorter control computer (3) collects information about the package as it moves through a camera (14), dimensioner (15), and weighing system (16). The sorter control computer uses this data to create a record specific for each package and to determine how the package should be sorted in the sorter sub-system (9). The sort point destination can be determined locally by the sorter control computer (3) or it can be determined by remote server (17) accessed by a data connection (18). Sort point destination is typically determined based primarily on destination address, particularly destination zip code, but may also be determined based for example on package size and/or weight and/or other data. The logic used to turn data about the package into a sort point destination may be viewable and changeable from the sorter control computer. There may be multiple levels of such sorting logic, e.g. primary, secondary, and tertiary. For example one level may narrow sort points possibilities based on one factor such as address, another may narrow further based on additional criteria such as size. Mail handlers, for example, have size limitations and weight restrictions for mail bags, so hand-carry routes may exclude packages above a certain size and/or weight which may have to go by car or truck, and hand-carry versus car/truck delivery may be assigned separate sort points. Once the sort point destination has been determined, data that includes the sort point destination is prepared for the package and it is sent to the first sort module PLC (7) using the sort module I/O network (6), which may be hard-wired such as with Ethernet cable, or based on Wi-Fi or other wireless communication.

The induction sub-system provides the overall control of the sorter operations and controls the package induction function. The sequential process for package induction provides an automatic check against "no-read" or bad barcodes. If a barcode (or other machine readable code, depending on the implementation) is successfully read but indicates that the package (or other object) should not be in the system, it may be sorted through into a reject bin. If the package (2) is not read by the camera (14), the sorter control computer (3) will not move the package to the next conveyor section and the induction sequence will stop. This greatly reduces the number of "no-reads" and reduces the number of times a package has to be re-run. The process may resume once the package's destination address is manually input or successfully manually re-scanned, or start on another package once the package is removed from the induction sub-system. An operator may manually enter the relevant information (e.g. destination address) or re-scan (e.g. by waving the bar code in front of the bar code scanner) to ensure the necessary information is received, at which time the sorter control computer will move the package to the next conveyor section. In some embodiments if an operator is not available a package may be diverted to a reject area for re-scanning at a later time while induction of other packages continues. A system where induction halts until necessary information is received provides an advantage over existing systems, in which barcode reading happens well downstream and there is no way to reposition or manually manipulate the packages, so typically about 10% of packages are not read, and go to a reject bin to be re-run.

Damaged barcodes are common in the shipping industry, so the sorter control computer also supports the manual input of routes or sort point destination bins to facilitate operations. In a mail handling application, typically each sort point corresponds to a different mail route, each route being assigned to a separate delivery vehicle. For such manual input cases, the sorter computer allows the operator to use a keyboard (19) or touch screen monitor (20) to manually input the route or sort point destination bin, and the induction sub-system will process the package according to the operator's input.

The sorter control computer provides another very useful feature: it allows the operator to back up and remove a package in the induction sub-system and clear the data already collected. This feature is used if the package becomes jammed somewhere in the induction conveyor sections midway through the data collection process. The sorter control computer provides a "back up" pushbutton (21) for the operator for quick resolution if an error is detected part-way through the induction sub-system (1). Pressing the pushbutton will notify the sorter control computer (3) to stop the motion of the conveyor sections (4) and holding the button down slowly reverses them until the package is within reach of the operator so that it can be repositioned or removed. After manually acquiring the jammed package, an operator rescans its barcode to re-induct the same package or scans a different package into the system and resumes operations. The sorter control computer automatically replaces the data associated with the jammed package with the new package data.

The sorter control computer (3) can also keep track of the volume of packages sorted to each sort point based on the sum of the volumes determined by the dimensions of packages with the same sort point destination. This data can be used to provide the operator notification when a particular bin is likely to be getting full and needs to be changed out. The threshold for providing such a notification may be user-configurable, via e.g. the sorter control computer, and may for example be when the estimated volume of packages delivered to a sort point is within 20% of the capacity at that sort point. The estimated volume of packages may vary depending on size and angularity of packages (or other objects) which may result in a looser or denser pack. In some embodiments, a user can select approximate size and shape ranges of the items to be scanned and a density factor may be estimated, from which an appropriate volume and fill safety threshold can be assigned. Operators can also adjust the threshold on the fly after seeing whether containers are too full or too empty when a change-out is indicated.

Sort point bin volume may be set up in the sorter control computer when first setting up the system, and updated manually as necessary using the manual input (or remotely) when bins are changed. Alternatively, bins may have a barcode, RFID chip or similar storing volume information and a corresponding sensor may read the volume information and provide it to the sorter control computer. In some embodiments, a set of containers with known volumes are provided for use with the system as sort point bins and these volumes may come pre-loaded in the sorter control computer. Packages with known volumes, e.g. flat rate shipping boxes, may also have their volume pre-loaded in the sorter control computer. In other embodiments, a user may supply containers and the sorter control computer may communicate with them to automatically identify their pertinent characteristics. Keeping the bins from overfilling with packages is an important operational feature, since an overfilled bin can cause packages to back up and then cause a jam in the sorter sub-system that is more difficult and time-consuming to resolve.

When jams are detected by any of the sort modules (22), the jam is reported to the sorter control computer. The sorter control computer will log these errors for analysis and can notify maintenance personnel of the error rates and the location of the errors in the sorter. The sorter control computer can initiate remedial actions to slow down the transport speed of troubled sort modules or skip the module altogether until the source of the error can be determined and a more permanent repair can be made, for example if the frequency of jams on a given sort module exceeds a preset threshold over a certain period of time. When a sort module is "skipped", all packages are simply conveyed by that sort module to the next sort module—none are discharged off the sides. Packages that should have been discharged by that sort module may be conveyed ultimately to a reject bin from which they can be collected and re-entered into the sorting stream once the sort module is put back into full operation.

FIG. 3 describes the induction sub-system hand-off to the sorter sub-system (9). Initially, the first sort module PLC (7) will communicate with the sort computer (3) in the induction sub-system (1) to move the package (23) onto the first sort module (8). To make this transition, the sorter control system computer (3) will communicate with the first sort module PLC (7) using the sort module I/O network (6) and request a "ready" message. If the first sort module (8) is clear, the PLC (7) will respond back with a clear-to-send message and the control system computer (3) will activate the conveyor to move the package onto the first sort module (8). At the same time, the sorter control computer (3) will transmit the package data set to the first module PLC (7) of the first sort module using the sort module I/O network (6). The data set will identify key information about the package including the package identification, the package length, and the package final destination. Additional data may include, the width, height, weight or any other relevant information.

FIG. 4 shows the module-to-module hand-off within the sorter sub-system. The transitions between sort modules are performed with the same logic, and the basic transaction is the same between all sort modules. Each sort module has local and independent control to accept a package from an upstream module, transport the package in the direction of travel (24), discharge the package to the right or left sort direction (25), or coordinate with the next module to accept the package. When a package (26) is waiting on the first sort module (8) ready to move to second sort module (27), the first sort module PLC (7) software sends a ready-to-send signal from the second sort module PLC (28). If no package is present on the second sort module (27), the second sort module PLC (28) will send a clear-to-send message to the first sort module PLC (7) and the package will move to the second sort module (27). The data packet specific to the package will be sent from the first sort module to the second sort module PLC when it is cleared to send the package.

If a package is present on the second sort module (27) or it is otherwise unavailable, the package (26) will wait on the first sort module (8) until such time that the second sort module (27) is clear and a clear-to-send message is sent to the first sort module PLC.

FIG. 5 illustrates the sort module components. Each sort module (22) is comprised of a conveying surface (29) that is equipped with a transport actuator (30) that will move the package over the transfer in the direction of travel (31). A second transfer actuator (32) will divert the package off the conveyor at a predefined position to "sort" the package into an adjacent conveyor or container. Each sort module is controlled locally by the sort module PLC (7) which is connected to adjacent sort modules through the sort module I/O network (6). A package sensor (33) is used to detect the leading and trailing edges of packages that are arriving at the sort module, which can be used to determine when a package has arrived on the sort module. Leading and trailing edges can also be used to determine or verify size and/or orientation of packages, although this information may be obtained during induction, as packages may shift during transport and become effectively longer or shorter in the longitudinal direction of the conveyor surface. Passing of the leading and trailing edges may also be used to determine speed of the package, although this is typically known from motor encoders of the sort module. An indicator lamp (34) is provided to indicate conditions at the sort modules and a push button (35) is provided for operator inputs (e.g. to stop the sort module or to put it back in operation after a jam has been cleared).

The sort module PLC (7) has a unique identifier number that corresponds with the sort module position in the overall sorter string. The sorter control computer can store these identifier numbers in connection with positions in the sorter string. In some embodiments, the sorter control computer may have a layout of the sorter, which may be pre-loaded or operator-entered, and then pre-assigned module identifiers may be entered in connection with each position of the layout. In other embodiments, the layout comes with pre-generated numbers for each position in the layout, and an operator then assigns each number to the corresponding sort module based on its position in the sorter string via the PLCs. In another embodiment, the sorter control computer can auto-configure the position-identifier relationship without operator involvement. The sort modules may be set up, a configure button (e.g. hard or soft button) pressed by the operator, and the sorter control computer may determine location of each sort module (for example using the network connecting them) and automatically assign the appropriate identifier.

Each PLC has the same set of control program(s) to interface with the package sensor (33), the transport actuator (30) and the transfer actuator (32). The transport actuator moves the package across the sort module (22) to the next module. This actuator can be a powered conveyor belt, mechanical powered pusher, or other means to transport the package. This actuator is activated when the PLC receives permission from the next sort module's PLC, indicating that the next sort module is free to receive the package. Thus, in such embodiments each sort module will have no more than one package at any given time (excluding jam conditions). Since a PLC, in normal operation, will not give the go-ahead to the previous sort module until its conveyor surface is clear, no more than half of the sort modules will have a package at any given time, and no more than half of the sort module conveyor surfaces will be operating at any given time. When operating at less than full capacity, the utilization rate is substantially lower than 50%. Because of this, sound levels are substantially lower than for conventional sorting systems with a single long conveyor belt that is essentially always operational. For example, even at full capacity total sound energy can be reduced by 50%. No hearing protection is needed, which is a significant improvement over conventional systems. An exception to this stop/start method of operation would be purge/train mode, in which the sort modules in that operating mode do not wait for permission and simply all activate their conveyor surfaces together in order to convey all packages off the end of the line and discharge them, for example to clear jams. The packages discharged off the end of the line can then be re-inserted into the induction sub-system if needed. Another exception would occur when packages are allowed to accumulate and stop, one per module, behind a downstream jam, analogous to a roadway traffic jam. Once the downstream jam is cleared, the sort modules activate to move the backed-up packages forward one at a time, restoring the normal spacing.

The transfer actuator (32) will propel the package off of the sort module (22) to the right or left to sort the package into a container, chute, or other type of discharges. Similarly, this actuator can be a conveyor belt, mechanical powered pusher or other means to propel the package to the right or left.

The sort module PLC (7) also handles local communications with the indicator lamps (34) and pushbuttons (35) as well as network communication with the upstream PLC (36) and downstream PLC (37), and sorter control computer (3). The PLCs can communicate with the sorter control computer and with the adjacent PLCs. In some embodiments, all PLCs and the sorter control computer are listening on a shared bus, so any communication can be sent to any device on the bus if properly addressed. Two sets of indicator lamps and pushbuttons may be provided for convenience so that one set may be located on either side of the sort module.

The data set for each package is generated by the sorter control computer and communicated to the sort module PLC (7) from the upstream PLC (36) as the package physically arrives at the sort module. The logic programmed in the sort module PLC (7) will give the upstream module permission to send the package, determine what speed to run the conveyor belt and whether the package should be diverted to the right, to the left, or passed along to the next module. If the package sort point destination is further downstream of the sorter, the sort module PLC (7) will communicate the data set to the downstream PLC (37) and request permission to send the package to the next sort module.

In this embodiment, package data is sent along with the package from PLC to PLC and includes package identification, address data, size, sort point destination per the sort scheme in effect, etc. Speed for the package is determined according to pre-programmed rules. For example, a sort module may run at regular speed unless the package is above a threshold size and/or being sorted on that module or the next, in which case speed may be reduced for example to ¾ of regular speed. If for example traffic is low and/or a package is not to be sorted until far down the line, speed may also be increased from regular speed in some embodiments.

The sort module PLC (7) will also turn on or off the indicator lamps (34) based on supervisory commands from the sorter control computer (3). As non-limiting examples, the indicator lamps can be used to show that the sorter is on, a flashing lamp can show that there is a jam detected in the sort module, or a slow flashing lamp can be used to show that the sort point destination bin should be getting full, based on aggregated dimensional data, and may require operator attention.

In a similar fashion, the sort module PLC (7) can interface with the pushbutton (35) to communicate operator inputs to the supervisory sorter control computer (3). As an example, an operator could stop the sorter from discharging to a specific position while the discharge container is being changed out, or while a jam is being cleared or maintenance function being performed. The module may be completely stopped, or may be allowed to run and pass packages on to the next sort module, but not discharge packages to the sort point where the discharge container is being changed. Any module may be turned on or off at any time. This provides a very important advantage over existing sortation systems, in which a single conveyor conveys all packages and the entire system must be shut down to prevent packages from being discharged while a container is being changed, maintenance performed or jams cleared. In contrast, embodiments of the present invention allow for such operations to be carried out while keeping the system almost completely operational. Pressing the pushbutton (35) would be an input to the sort module PLC (7) and would be communicated through the sort module I/O network (6) to the supervisory control computer (3).

FIG. 6 illustrates one sample module design (cf. U.S. patent application Ser. No. 15/916,248, filed Mar. 3, 2018). This is one of many mechanical solutions that uses two actuators to transport and sort packages. In this design, two conveyor belts are mounted crosswise to each other and the top conveyor incorporates a multitude of rotating elements that carry the package on top and the rotating elements are supported by a crosswise conveyor belt underneath. The coordinated movement of the two conveyor belts will cause the package to move in a straight line or change directions to the right or left for discharge. The transfer module frame (38) provides the structure to support the top plastic conveyor belt (39) that has internal rotating elements (40) and is mounted above flat transfer belt (41). The frame supports the conveyor drive roller (42) for the top plastic belt and the drive roller (43) for the transfer belt mounted underneath.

The rotating elements of the top plastic conveyor rotate when the conveyor is in motion because of their contact with the flat transfer belt mounted underneath and a package on the top surface will be propelled in the direction of the belt motion. Additionally, when the transfer belt (41) underneath is activated by its drive roller (43), the rotating elements (40) of the top belt will change direction and a package sitting on top of the conveyor will be propelled to the right or left for sortation. This is a particularly efficient mechanical solution and the subject of the patent application noted above. However, many other mechanical solutions are possible and anticipated.

FIG. 7 illustrates how an angled through-beam array is used to detect even the smallest package as it moves between sort modules. The control system for this modular sorter design requires the accurate tracking of packages as they move from sort module to sort module. This is a challenging requirement for a sorter that must handle a wide range of package sizes and package types. Typically, this tracking is performed with simple sensors such as proximity sensors, through-beam sensors, ultrasonic sensors, or reflective sensors. However, each of these sensor types is limited to what types and sizes of packages can be detected.

The angled through-beam array shown in FIG. 7 is a series of individual through-beam sensors mounted in a common enclosure. Each through-beam array has an emitter (44) and receiver (45). The light beam array (46) is a screen of individual light beams that are spaced very close together—here a dozen beams spaced ¼" apart. The emitter and receivers are also mounted at an angle (47) to cover the area between the sensors with a diagonal pattern of light beams. The diagonal pattern of light beams greatly improves the performance of this system to detect very thin packages (48) moving between the conveying surfaces (49). Packages that are thinner than the spacing between light beams will block one or more angled beams (50) and the package will be detected. This feature greatly extends the sorter's versatility to handle a wide variety of package sizes from large boxes to flat envelopes to even single business cards. If it is known that objects of a certain thinness will not be encountered by the system, cheaper sensors having fewer, more widely spaced, beams may be used. For example, for shoebox-size items, a simple single through-beam would typically be sufficient. The sensors are positioned in between sort modules to detect when a package (or other object) transitions between one sort module and the next.

FIG. 8 illustrates one of the adaptive speed control logic features of the sort module PLC programming when handling larger package sizes. The sorter must accurately position each package before it is discharged from the sort module. The proper position and timing will change depending on the size of the package being processed. The larger a package is relative to the sort module, the more precise the position control must be to ensure the package is properly delivered to the sort point destination and not for example onto the floor. Position of the package may be determined based on the sensor shown in FIG. 7 which detects the package's entry onto the sort module, combined with time passed since the package's entry was detected (leading or trailing edge), using the leading or trailing edge of the package, and/or the speed of the conveying surface. In some embodiments a single sort module may feed multiple sort points/containers on a single side, in which case position of a package on the conveyor surface is important, however many implementations have only a single sort point to either side of a given sort module. The sorter is designed to run as fast as possible to maximize its throughput. However, larger packages have less available room to be diverted or stop on a given module size. In normal operation, stopping is required when the downstream module is not clear, i.e. it contains a package. Attempts to divert or stop a large package in an insufficient distance and timeframe may result in the package slipping on the conveying surface and overrunning its sort module, missing its sort point destination, or leaving the sort system entirely. To accommodate these packages, the PLC is programmed to adapt to the larger package and automatically slow down the conveyor speed when a larger package is encountered.

What constitutes a larger package and how much the speed needs to be reduced may be pre-programmed, or operational adjustments can be determined empirically. The measure of size may be captured in the induction sub-system by an imaging-type dimensioner or by calculating package length as the package crosses a through-beam sensor array in the induction sub-section running at a known rate of speed from leading edge to trailing edge. Calculations of appropriate speed reduction can be complex, as they are affected by many factors, including package mass, coefficient of friction of packaging material and its irregularities on conveyor material and contact points, differenced between longitudinal and lateral movement, motion of a particular package when hit with diverting forces, etc. Although such calculations are known and may be performed, to higher or lower accuracy based on the information and calculating resources available, they are largely unnecessary. Instead, the system may be programmed to reduce speed to a predetermined threshold of normal operating speed, for example ¾, when package length to module length is greater than a threshold ratio. Multiple thresholds for length ratio and corresponding speed reduction may be programmed— for example ¾ speed at a ½ length ratio, ½ speed at a ¾ length ratio, etc. The system may then log jam/reliability rates and determine whether the speed reduction at a given length ratio is adequate (for example using a programmed reliability threshold, e.g. 95% accurate non-jam sorting) and adjust if indicated, or based on operator input. The appropriate speed at given package length ratios to achieve a desired reliability for a given implementation may be determined empirically by the sorter control computer as speeds, length ratios, and jam frequency/reliability are logged. Operating speed as a function of length ratio may be automatically adjusted when reliability is detected to vary from a desired level.

As previously described herein, package dimension data is collected during the package induction process and is communicated to the individual sort module PLC with the data packet that travels from sort module to sort module with the physical package. If a large package (51) exceeds a preprogrammed value, the sort module PLC (52) on the sort module (53) may decrease the transport velocity (54). The transport velocity (54) is automatically reset to the default speed after the package has left the sort module. As the package moves to the next sort module (55), the next PLC (56) program may similarly decrease the transport velocity (57) in that sort module for that package and automatically reset to the default value when the package has left that sort module.

For example, each sort module starts when the sensor located in the gap immediately before the sort module detects the leading edge of a package. Packages will pass over a sort module without stopping if the next sort module is clear and ready to accept the next package. The sort module will continue to run and transport the package to the downstream sort module and stop when the sensor at the beginning of downstream sort module sees the trailing edge of the package.

However, if the next module is not clear, the package will have to stop before entering the next module. In this case the first sort module will start as before when the entrance sensor detects the leading edge of a package. However, the sort module must stop the package before blocking the entrance sensor of the downstream zone. To stop the package in time, the same sensor that detects the leading edge of the package is also used to detect the trailing edge of the package and signal the zone to stop.

If the sort module is 40 inches long, and transporting a 10 inch package at 40 inches per second, the package will have 30 inches, or ¾ seconds after the trailing edge of the package clears the entrance sensor to the zone and before the leading edge is detected by the entrance sensor to the next sort module. However, if the same sort module is transporting a larger 20 inch package, this package will only have 20 inches, or ½ second after the trailing edge clears the entrance sensor.

In some cases, this may not be enough time or distance for the package to stop, if it is required to be stopped, before triggering the entrance sensor of the next sort module, causing a jam condition.

The adaptive features of the program running on the PLCs of the sort modules may be used to slow the transport speed of the sort module to increase the package stopping time to avoid a jam condition. In this example, the PLC of the sort module knows that the package is 20 inches long (as determined at induction of the package and/or by the sensor). Based on pre-programmed values, or machine learning, the PLC knows 40 in/s is too fast for the package to be stopped, if it required to stop if a package that is occupying the next downstream module. The PLC therefore slows the transport speed of the module to 20 inches per second, giving the 20 inch package 20 inches or a full 1 second to come to a stop, if it is required to stop, before causing a jam. These adaptive features allow the sorter to run at maximum throughput rates and dynamically adjust the transport speed to improve reliability over a wide range of package sizes.

FIG. 9 illustrates another important use of the adaptive speed control: slowing down the conveyor speed in anticipation of an upcoming sort point destination. The wide variety of package types presents varying mechanical interactions with the conveying surface. Purely as a non-limiting example, some packages can be slippery and take longer to change directions and discharge from the sorter to avoid slipping on the conveyor surface. Overshooting a sort point can cause a jam condition and require operator intervention.

Dynamically slowing the transport conveyor based on the knowledge that the package will be sorted in the next sort module greatly increases the reliability for package sortation by increasing the timing tolerance to initiate a discharge. The ability to anticipate and automatically adjust the speed of the conveyor modules, while the packages are being transported, greatly increases the accuracy and reliability of both the transport and the sortation functions and avoids unnecessary jams from packages failing to stop or failing to discharge in the available time and length of the sort module. The decision to slow down the transport conveyor can also be programmed as a function of the package. Small packages may not require any speed adjustment to allow a downstream package to be diverted. However, larger packages have less tolerance and will frequently require a speed adjustment to maintain maximum reliability.

FIG. 9 illustrates the control logic where a package (58) in sort module (59) is going to be sorted (60) in the next sort module (61). The PLC (62) may reduce the transport velocity (63) so that the package will enter the next module (61) with less speed and hence less chance of sliding and overshooting as it turns and is sorted (60).

Each sort module PLC has this same adaptive feature in its control program to slow down the transport speed of a package on its module, assuming the package is destined to be sorted in the next downstream sort module. This logic will follow each package as it moves down the sorter based on the data set prepared by the sort computer (3) and relayed to the sort modules through the sort module I/O network (6). No further control is required from the sort computer.

Similarly, the sort module PLC programs can look ahead and increase the package transport speed based on the knowledge that the next few zones are clear of traffic and there is no impending transfer/sort event.

Collectively, the adaptive speed modification programs that run independently in each of the sort modules can improve the overall sorter throughput and reliability without burdening the sorter control computer with calculating the local conditions at each sort module.

Jam detection is an important feature of the sorter. Stopping the sorter when a jam is detected avoids mis-sorts and provides timely alerts for operators to clear the jam and resume full operational throughput. When a jam is detected, it is reported to the sorter control computer and only the sort module(s) associated with the jam stops processing and its indicator lamp is turned on to notify operators. Jams may be detected based on a through-beam sensor sensing a package when none was expected—i.e. the sort module before the sensor was not given the go-ahead to proceed, which may indicate a package slid into the sensor area when it should have stopped or been diverted off the sorter—or not sensing a package when one was expected—i.e. the sort module before the sensor was given the go ahead to convey the package onward, which may indicate that the package is stuck on something or fell off the conveyor surface. Until the jam is cleared the sort module(s) associated with the jam will not send a ready signal to the preceding sort module, so additional packages will not be conveyed onto it.

FIG. 10 illustrates the jam detection logic that runs on each of the sort module PLCs independent of the sorter control computer in the induction sub-system. In this illustration, the package (63) has just cleared the sensor (64) as it arrives on the sort module (65). However, the next downstream package sensor (66) has just detected a package (67) much sooner than anticipated, based on the length of the expected package (63) and sort module transport velocity (68).

The unexpected early arrival is communicated to the sorter control computer (3) as an "unknown package" and the package transport actuator (30) is stopped in the sort module that is affected. The sort module PLC (69) will flash the indicator lamp (34) and the operators are instructed to simply remove the packages in that area and re-start the sorter by pressing the pushbutton (35).

Several different jam detection routines are running in each sort module PLC based on the anticipation of detecting the arrival of packages at a specific module. Here are some non-limiting examples of such routines:

A package did not arrive when expected. Similar to the "unknown package" jam described above, this jam is based on not seeing the package when anticipated. If a package is not detected by the package sensor when it was anticipated, the PLC will report a package transport jam, and the sorter control system will stop the conveyor module, raise an alarm, and indicate that the package failed to transport.

Package or debris jammed on conveyor. If a package detecting sensor, such as a through-beam sensor as described herein, is blocked and remains blocked between sort modules, the module PLC will report a transport jam. The control system will likewise stop the conveyor module, raise an alarm, and indicate that the packages(s) are jammed on the conveyor.

In all cases, the sorter control system will provide notification to the operator of where the jam(s) is detected. This notification is available on the sorter control screen and also with indicator lamps located at each sort module. When a jam is reported, the sorter control system will stop the sort modules where the jam is detected and flash the lamps to show the operator where the problem is detected. An additional notification will be shown on the control system display. Operators will clear the jam(s) in the affected areas and remove the packages. The operator will notify the control system that the packages have been removed and the jam resolved by pressing a pushbutton co-located with the indicator lamp. Depending on how the sorter is staffed with operators, a secondary push button located at the operator's station may be used to clear all jam conditions from the same point. Once the jam has been cleared, the affected sort modules resume operations.

It is important to note that the independent PLC control of the sort modules will allow the portions of the sorter outside of the area where the jam is detected to continue to process packages until the package flow is backed up by the stopped modules. This is an important feature since jams are frequently resolved before the sorter is stopped from a backup of stopped packages.

The sorter control system keeps track of the number of jams and the type of jam for each sorter module. A diagnostics log is kept to identify problematic sorter sections where additional maintenance oversight is warranted. Diagnostic logging can also be used by the sorter control system to provide inputs for the dynamic speed control of the sort modules to automatically compensate for underperforming sort modules, where mechanical wear or contamination has changed the performance of the transport and transfer mechanisms.

FIG. 11 illustrates the sorter's capability for continuous sorting in areas that are not affected by a local jam. This is an important ability, since maximum throughput is always a key consideration for sorter systems. The modular architecture allows the sorter to continue to sort packages to discharge bins that are unaffected by a localized jam or bin full condition. This feature allows the sorter to continue doing productive work for a period of time until the jam or bin full condition is cleared. Frequently these conditions can be cleared before the package flow backs up and blocks the induction of new packages. In these cases, the jams or bin change-outs will not impact the overall sorter throughput.

FIG. 11 shows that sort module (69) has detected a jam and the module has stopped. The sort module PLC in module (70) has not gotten a "clear to send" signal so the package (71) is stopped in module (72) and is waiting for module (69) to be cleared. Package (73) is destined further down the sorter but must wait until module (72) is clear. However, module (74) and module (75) can continue to transport and sort packages without interruption.

FIG. 12 describes how the sorter control computer can also override the local sort module PLC(s) to turn on the transport actuators of multiple sort modules to all run together to move all packages at once, without the intra-module communication and control. This function can be used to purge the sorter of packages or clear multiple jam conditions when it is easier to purge a zone of modules and re-run the packages on the sorter. This purge function can also be run in just a zone where only a select group of modules are run as a group to the end of the sorter. Packages upstream and downstream of the reject zone would sort as usual and when the affected sections are run off the end, the entire sorter operation will be back to normal.

FIG. 12 illustrates this purge function where a set of modules has been identified as the purge zone (76). These sort modules will operate together as one large zone to transport all of the packages together by running the entire zone as one. The local PLC logic in the modules is overridden by the sorter computer to move the group of packages as a whole to the end of the sorter and into the reject bin (77). The sort modules in the purge zone (76) keep transporting packages forward but do not attempt to sort them off to the side, to avoid sorting errors. Other packages on sort modules outside of the purge zone will operate as normal, passing packages from module to module and sorting accordingly. Package (78) in the illustration will move to the next module when package (79) has been sorted off of the module. Package (80) will divert and sort as normal. Purge zone (76) follows the jammed packages down the line of sort modules. When the jammed packages reach sort module (74), purge zone (76) will include sort module (74) and the previous sort module, but not the sort module previous to that, and so on until the jammed packages are in the reject bin, at which time no sort modules will be in the purge zone (76) (unless a new jam condition and new purge zone has been established in the meantime).

We claim:

1. A modular package sorting system, comprising:
 a plurality of sort modules configured to convey a package to one of a plurality of sortation points corresponding to a sort point destination of the package; and
 a distributed control architecture comprising a plurality of controllers, each of the plurality of controllers being associated with one sort module in the plurality of sort modules,
 wherein each of the plurality of controllers is configured to communicate with one or more other controllers in the plurality of controllers, including to receive and transmit an electronic packet of data, and to determine, using information contained in the electronic packet of data, whether to convey the package from the associated one sort module to a subsequent sort module or to a sortation point associated with the one sort module, based on the sort point destination for the package,
 wherein the electronic packet of data includes the sort point destination for the package, and
 wherein each of the plurality of controllers is capable of controlling its respective sort module.

2. The modular package sorting system of claim 1, wherein each controller is configured to provide status information about the associated sort module.

3. The modular package sorting system of claim 1, wherein the plurality of controllers is configured to determine, before moving each package from one sort module to a next sort module, whether another package is located on the next sort module and, if so, waiting to move the package onto the next sort module until the other package is no longer located on the next sort module.

4. The modular package sorting system of claim 1, wherein each of the plurality of controllers has its own rule set.

5. The modular package sorting system of claim 1, wherein the distributed control architecture is configured to distribute control of the plurality of sort modules among the plurality of controllers.

6. The modular package sorting system of claim 1, wherein the electronic packet of data further comprises information relating to physical dimensions of the package.

7. The modular package sorting system of claim 1, wherein each of the plurality of controllers is configured to receive the electronic packet of data from an immediately preceding controller in a sequence, and subsequently to convey the electronic packet of data to an immediately succeeding controller in the sequence.

8. The modular package sorting system of claim 1, wherein the transmission of the electronic packet of data occurs at the same time as the conveyance of the package from the associated one sort module to the subsequent sort module or to the sortation point associated with the one sort module.

9. The modular package sorting system of claim 1, wherein the electronic packet of data further comprises information identifying the package and/or the package's dimensions and/or the package's weight.

10. The modular package sorting system of claim 1, wherein a first controller in the plurality of controllers is associated with a first sort module in the plurality of sort modules, a second controller in the plurality of controllers is associated with a second sort module in the plurality of sort modules, a third controller in the plurality of controllers is associated with a third sort module in the plurality of sort modules, the first, second, and third sort modules being connected in series, and
wherein the second controller is configured to receive a query from the first controller as to whether the second sort module is empty, and to transmit a response to the query from the first controller when the second sort module is empty, and when the package received on the second sort module is to be transported to the third sort module, selecting a speed from among a plurality of speeds pre-installed in the second controller at which to send the package to the third sort module, sending a query to the third controller as to whether the third sort module is empty, and only sending the package to the third controller after having received a response from the third controller to the query to the third controller.

11. The modular package sorting system of claim 1, wherein the plurality of sort modules comprises a series of sort modules physically connected together end-to-end and being configured to convey items from the first sort module to a last sort module over the series of sort modules, and the controller associated with each sort module is configured to communicate with controllers associated with sort modules just before and just after in the series, when they exist.

12. The modular package sorting system of claim 11, wherein each controller of the plurality of controllers is programmed to carry out an identical operation, the operation comprising receiving the sort point destination from an induction subsystem or from a controller of an immediately preceding sort module, using the sort point destination to determine whether to move the package off the side of the associated sort module to a sort point or to convey the package to an immediately subsequent sort module, and, when conveying the package to the immediately subsequent sort module, transmitting the sort point destination to the controller associated with the immediately subsequent sort module.

13. The modular package sorting system of claim 1, wherein each of the plurality of controllers is further configured for communication only with the controllers associated with sort modules immediately preceding and immediately following the associated one sort module, the communication including responding to a request from the controller associated with the immediately preceding sort module, receiving a packet of data comprising the sort point destination for the package from the immediately preceding sort module when the package is conveyed from the immediately preceding sort module to the associated one sort module, sending a request to the controller associated with the immediately following sort module when the sort point destination of the package is not the sortation point associated with the one sort module, and sending the packet of data to the immediately following sort module when conveying the package to the immediately following sort module.

14. The modular package sorting system of claim 13, further comprising a second plurality of sort modules, each of the second plurality of sort modules having only an immediately preceding sort module or an immediately following sort module, but not both, such immediately preceding sort module or immediately following sort module being one of the plurality of sort modules.

15. The modular package sorting system of claim 1, further comprising sensors configured to track movement of the package across the sort modules, wherein the sensors comprise proximity sensors, through-beam sensors, ultrasonic sensors, and/or reflective sensors.

16. The modular package sorting system of claim 15, wherein the sensors comprise a plurality of angled through-beam array sensors, and wherein each of the plurality of angled through-beam array sensors comprises:
a light beam array comprising a plurality of individual light beams, at least one of the plurality of individual light beams being diagonal relative to a conveyor surface;
an emitter; and
a receiver.

17. The modular package sorting system of claim 15, wherein the sensors comprise sensors between sort modules to determine when items pass from one sort module to another, each such sensor being associated with the controller associated with the sort module before or after the sensor, wherein the controller associated with the sensor is configured to report a jam and/or stop the associated sort module when the associated sensor does not sense an item when expected because of communication received by the controller associated with the sensor or when the associated sensor senses the item for longer than a pre-determined amount of time.

18. The modular package sorting system of claim 1, wherein each of the plurality of sort modules comprises a conveyor surface configured to move items on the conveyor surface forwards and to either side.

19. The modular package sorting system of claim 18, wherein the conveyor surface comprises a transport actuator configured to move items on the conveyor surface forwards and backwards, and a second transfer actuator configured to move items on the conveyor surface to either side.

20. The modular package sorting system of claim 18, wherein each controller is configured to control mechanical operation of the conveyor surface of the corresponding sort module, wherein the plurality of sort point destinations is located to one or more sides of the plurality of sort modules and the plurality of sort modules are configured to deliver packages to the sort point destinations by conveying them to the one or more sides of the sort modules.

21. The modular package sorting system of claim 18, wherein each controller of the plurality of controllers is programmed to reduce speed of the conveyor surface of the corresponding sort module when an item on the conveyor surface of the corresponding sort module exceeds a dimensional and/or weight threshold.

22. The modular package sorting system of claim 18, wherein each controller of the plurality of controllers is programmed to reduce speed of the conveyor surface of the corresponding sort module when an item on the conveyor surface of the corresponding sort module has a sort point destination located adjacent to an immediately subsequent sort module.

23. The modular package sorting system of claim 18, wherein each controller of the plurality of controllers is programmed to increase speed of the conveyor surface of the corresponding sort module when an item on the conveyor surface of the corresponding sort module has a sort point destination located beyond an immediately subsequent sort module and a pre-determined number of subsequent sort modules have no items on their respective conveyor surfaces.

24. The modular package sorting system of claim 1, wherein each of the plurality of controllers is further configured to determine a speed among a plurality of speeds at which to send the package to the subsequent sort module.

25. The modular package sorting system of claim 24, wherein the speed determination depends at least on whether the package is to be discharged to a sortation point associated with the subsequent sort module.

26. The modular package sorting system of claim 24, wherein the speed determination depends at least on whether the package is to be discharged to a sortation point associated with a sort module downstream of the subsequent sort module.

27. The modular package sorting system of claim 24, wherein the determined speed differs from a speed at which the associated one sort module received the package.

28. The modular package sorting system of claim 24, wherein the plurality of speeds is pre-installed on each of the plurality of controllers.

29. The modular package sorting system of claim 24, wherein the determining of the speed depends at least on physical dimensions of the package.

30. The modular package sorting system of claim 1, further comprising an induction subsystem configured to initially receive the package and transport it to the plurality of sort modules, wherein the induction subsystem is configured not to transport the package to the plurality of sort modules until information is successfully read from a label of the package.

31. The modular package sorting system of claim 30, wherein the induction subsystem is configured to obtain information regarding the received package, to determine the sort point destination for the received package based on the obtained information, and to transmit the sort point destination to the plurality of sort modules.

32. The modular package sorting system of claim 31, wherein the information regarding the received package comprises address information, dimensions, and weight.

33. The modular package sorting system of claim 31, wherein the induction sub-system is configured to determine the sort point destination based at least in part on the address information, package dimensions, and/or weight.

34. The modular package sorting system of claim 31, wherein the induction sub-system comprises an imaging device, a dimensioner, and a weighing system, wherein the induction sub-system is configured to read a barcode of the package with the imaging device and, when the barcode cannot be read, to halt induction of the package until the barcode is read successfully or necessary information is input manually, wherein the induction sub-system is configured to halt induction of the package and clear the obtained information regarding the received package responsive to an input instruction.

35. The modular package sorting system of claim 31, wherein the induction sub-system comprises conveyor components controlled by a sorter control computer configured to move the package through a series of stations and collect the information regarding the received package.

36. The modular package sorting system of claim 35, wherein each of the plurality of controllers is capable of controlling its respective sort module independently of the sorter control computer.

37. The modular package sorting system of claim 31, wherein the induction sub-system is configured to transmit the sort point destination to a first controller of the plurality of controllers associated with a first sort module of the plurality of sort modules, to which the package is conveyed from the induction sub-system.

38. The modular package sorting system of claim 37, wherein each of the plurality of controllers is configured to communicate with a subsequent controller of the plurality of controllers, and wherein each of the subsequent controllers is associated with an immediately subsequent sort module of the plurality of sort modules to which the controller is configured to convey the package via the sort module associated with the controller, and to transmit to the subsequent controller the sort point destination.

39. The modular package sorting system of claim 38, wherein the plurality of sort modules may be rearranged in any order while maintaining the ability of each controller to communicate with the subsequent controller associated with the sort module to which its associated sort module is configured to convey the package, even though an identity of the subsequent controller changes due to the rearrangement.

40. The modular package sorting system of claim 31, further comprising a sorter control computer configured to determine the sort point destination based on the information regarding the received package.

41. The modular package sorting system of claim 40, wherein the sorter control computer is configured to communicate with the plurality of controllers.

42. The modular package sorting system of claim 40, wherein the sorter control computer is configured to keep track of a volume of packages sorted to each of the plurality of sortation points based on dimensional information of packages determined to have each sort point as their sort point destination, comparing the volume of packages to a capacity of each of the plurality of sortation points, and providing notification when a particular sortation point is determined to be within a threshold percentage of its capacity.

43. The modular package sorting system of claim 40, wherein the sorter control computer is configured to log errors, report error rates and error locations, and route around and/or reduce speed of sort modules experiencing errors.

44. A modular package sorting system, comprising:

a plurality of sort modules configured to convey a package to one of a plurality of sortation points corresponding to a sort point destination of the package; and a distributed control architecture comprising a plurality of controllers, each of the plurality of controllers being associated with one sort module in the plurality of sort modules, wherein each of the plurality of controllers is configured to communicate with one or more other controllers in the plurality of controllers and to determine whether to convey the package from the associated one sort module to a subsequent sort module or to a sortation point associated with the one sort module, based on the sort point destination for the package, and wherein each of the plurality of controllers is capable of controlling its respective sort module, further comprising an induction subsystem configured to initially receive the package and transport it to the plurality of sort modules, wherein the induction subsystem is configured not to transport the package to the plurality of sort modules until information is successfully read from a label of the package, wherein the induction subsystem is configured to obtain information regarding the received package, to determine the sort point destination for the received package based on the obtained information, and to transmit the sort point destination to the plurality of sort modules, further comprising a sorter control computer configured to determine the sort point destination based on the information regarding the received package, wherein the sorter control computer is configured to take away control of two or more of the sort modules from the controllers and run the two or more sort modules together to purge the two or more sort modules of packages, responsive to a jam being detected and/or to user input.

45. The modular package sorting system of claim 44, wherein the sorter control computer is configured to leave one or more other of the sort modules under control of their controllers when taking control of the two or more sort modules.

46. A modular package sorting system, comprising:

a plurality of sort modules configured to convey a package to one of a plurality of sortation points corresponding to a sort point destination of the package and comprising a plurality of controllers, each of the plurality of controllers being associated with one sort module in the plurality of sort modules, wherein each of the plurality of controllers is configured to communicate with one or more other controllers in the plurality of controllers and to determine whether to convey the package from the associated one sort module to a subsequent sort module or to a sortation point associated with the one sort module, based on the sort point destination for the package, and wherein each of the plurality of controllers is configured to receive a request for a first ready message, transmit the first ready message when the corresponding sort module is determined to be empty, determine whether a package received on the corresponding sort module is to be discharged to a right or left sort direction or transported to another sort module, and when the package received on the corresponding sort module is to be transported to another sort module, sending a request for a second ready message to the controller corresponding to the another sort module, receiving the second ready message from the controller corresponding to the another sort module, and sending the package received on the corresponding sort module to the another sort module, responsive to receipt of the second ready message from the controller corresponding to the another sort module.

47. A modular package sorting system, comprising:

a plurality of self-controlled sort modules configured to convey a package to a one of a plurality of sortation points, and comprising a plurality of controllers, each of the plurality of controllers being associated with one sort module in the plurality of sort modules, wherein each of the plurality of controllers is configured to determine, when the package is received on the corresponding sort module, whether to convey the package to a subsequent sort module or to a sortation point associated with the corresponding sort module, and, when the package is to be conveyed to the subsequent sort module, is configured to communicate with the controller associated with the subsequent sort module by transmitting a request for a ready message to the controller corresponding to the subsequent sort module and by receiving the ready message from the controller corresponding to the subsequent sort module, and to send the package to the subsequent sort module after receipt of the ready message from the controller corresponding to the subsequent sort module.

48. The modular package sorting system of claim 47, wherein the message received from the controller associated with the subsequent sort module indicates that the subsequent sort module is ready to receive the package.

49. The modular package sorting system of claim 47, wherein each of the plurality of controllers is configured to enable the self-control of its respective sort module.

50. The modular package sorting system of claim 47, wherein each of the plurality of controllers is autonomous from a central operator supervisory control.

51. The modular package sorting system of claim 47, wherein each controller is configured to provide status information about the corresponding sort module.

52. The modular package sorting system of claim 47, wherein the plurality of controllers is configured to determine, before moving each package from one sort module to a next sort module, whether another package is located on the next sort module and, if so, waiting to move the package onto the next sort module until the other package is no longer located on the next sort module.

53. The modular package sorting system of claim 47, wherein each of the plurality of controllers comprises an identical standard protocol for communicating with sort modules adjacent to the associated one sort module.

54. The modular package sorting system of claim 53, wherein the standard protocol is configured to enable the sending of the package to the subsequent sort module.

55. The modular package sorting system of claim 47, wherein the plurality of sort modules comprises a series of sort modules physically connected together end-to-end and being configured to convey items from a first sort module to a last sort module over the series of sort modules, and the controller associated with each sort module is configured to communicate with controllers associated with sort modules just before and just after in the series, when they exist.

56. The modular package sorting system of claim 55, wherein each controller of the plurality of controllers is programmed to carry out an identical operation, the operation comprising receiving a sort point destination from an induction subsystem or from a controller of an immediately preceding sort module, using the sort point destination to determine whether to move the package off to a side of the corresponding sort module to the sortation point associated with the corresponding sort module or to convey the package to an immediately subsequent sort module, and, when conveying the package to the immediately subsequent sort module, transmitting the sort point destination to the controller associated with the immediately subsequent sort module.

57. The modular package sorting system of claim 47, further comprising sensors configured to track movement of the package across the sort modules, wherein the sensors comprise proximity sensors, through-beam sensors, ultrasonic sensors, and/or reflective sensors.

58. The modular package sorting system of claim 57, wherein the sensors comprise a plurality of angled through-beam array sensors, and wherein each of the plurality of angled through-beam array sensors comprises:
  a light beam array comprising a plurality of individual light beams, at least one of the plurality of individual light beams being diagonal relative to a conveyor surface;
  an emitter; and
  a receiver.

59. The modular package sorting system of claim 57, wherein the sensors comprise sensors between sort modules to determine when items pass from one sort module to another, each such sensor being associated with the controller associated with the sort module before or after the sensor, wherein the controller associated with the sensor is configured to report a jam and/or stop the associated sort module when the associated sensor does not sense an item when expected because of communication received by the controller associated with the sensor or when the associated sensor senses the item for longer than a pre-determined amount of time.

60. The modular package sorting system of claim 47, wherein each of the plurality of sort modules comprises a conveyor surface configured to move items on the conveyor surface forwards and to either side.

61. The modular package sorting system of claim 60, wherein the conveyor surface comprises a transport actuator configured to move items on the conveyor surface forwards and backwards, and a second transfer actuator configured to move items on the conveyor surface to either side.

62. The modular package sorting system of claim 60, wherein each controller is configured to control mechanical operation of the conveyor surface of the corresponding sort module, wherein the plurality of sort point destinations is located to one or more sides of the plurality of sort modules and the plurality of sort modules are configured to deliver packages to sort point destinations by conveying them to the one or more sides of the sort modules.

63. The modular package sorting system of claim 60, wherein each controller of the plurality of controllers is programmed to reduce speed of the conveyor surface of the corresponding sort module when an item on the conveyor surface of the corresponding sort module exceeds a dimensional and/or weight threshold.

64. The modular package sorting system of claim 60, wherein each controller of the plurality of controllers is programmed to reduce speed of the conveyor surface of the corresponding sort module when an item on the conveyor surface of the corresponding sort module has a sort point destination located adjacent to an immediately subsequent sort module.

65. The modular package sorting system of claim 60, wherein each controller of the plurality of controllers is programmed to increase speed of the conveyor surface of the corresponding sort module when an item on the conveyor surface of the corresponding sort module has a sort point destination located beyond an immediately subsequent sort module and a pre-determined number of subsequent sort modules have no items on their respective conveyor surfaces.

* * * * *